US012600925B2

(12) United States Patent
Bonesso et al.

(10) Patent No.: US 12,600,925 B2
(45) Date of Patent: Apr. 14, 2026

(54) LAUNDRY SANITIZING AND SOFTENING COMPOSITIONS

(71) Applicant: Reckitt Benckiser LLC, Parsippany, NJ (US)

(72) Inventors: Marcella Bonesso, Mira (IT); Andre Chieffi, Mira (IT); Giulia Colledan, Mira (IT); Joseph Fredrick Convery, II, Montvale, NJ (US); Anna Del Monaco, Mira (IT); Santigie Mansaray, Montvale, NJ (US); Remigio Musci, Mira (IT); Federico Pacini, Mira (IT); Benjamin Aaron Pearl, Montvale, NJ (US); Antonio Vincenzo Petrozzino, Montvale, NJ (US); Tracy Ann Ryan, Montvale, NJ (US); Anna Kepa Sigmund, Montvale, NJ (US); Alberto Simionato, Mira (IT); Alessandra Travanut, Mira (IT); Elisa Vanzetto, Mira (IT); Stephanie Kaitlyn Yiu, Montvale, NJ (US)

(73) Assignee: Reckitt Benckiser LLC, Parsippany, NJ (US)

( * ) Notice: Subject to any disclaimer, the term of this patent is extended or adjusted under 35 U.S.C. 154(b) by 348 days.

(21) Appl. No.: 18/304,584

(22) Filed: Apr. 21, 2023

(65) Prior Publication Data

US 2024/0352380 A1 Oct. 24, 2024

(51) Int. Cl.

| | |
|---|---|
| ***C11D 1/62*** | (2006.01) |
| ***C11D 1/75*** | (2006.01) |
| ***C11D 3/00*** | (2006.01) |
| ***C11D 3/20*** | (2006.01) |
| ***C11D 3/22*** | (2006.01) |
| ***C11D 3/30*** | (2006.01) |
| ***C11D 3/34*** | (2006.01) |
| ***C11D 3/43*** | (2006.01) |
| ***C11D 3/48*** | (2006.01) |
| ***C11D 3/50*** | (2006.01) |

(52) U.S. Cl.

CPC .............. *C11D 3/30* (2013.01); *C11D 3/0015* (2013.01); *C11D 3/2044* (2013.01); *C11D 3/2068* (2013.01); *C11D 3/2086* (2013.01); *C11D 3/222* (2013.01); *C11D 3/349* (2013.01); *C11D 3/43* (2013.01); *C11D 3/48* (2013.01); *C11D 3/505* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 3,349,033 | A | 10/1967 | Zuccarelli | |
| 3,625,891 | A | 12/1971 | Waldman et al. | |
| 4,476,030 | A | 10/1984 | Bucking et al. | |
| 4,795,032 | A | 1/1989 | Kandathil | |
| 5,522,942 | A | 6/1996 | Graubart | |
| 5,767,052 | A | 6/1998 | Shaw, Jr. et al. | |
| 7,589,055 | B2 | 9/2009 | Fehr et al. | |
| 8,609,149 | B2 | 12/2013 | Callahan et al. | |
| 9,357,771 | B2 | 6/2016 | Seidling et al. | |
| 10,433,545 | B2 | 10/2019 | Karandikar et al. | |
| 2002/0099113 | A1 | 7/2002 | Rabasco et al. | |
| 2002/0187911 | A1 | 12/2002 | Liew | |
| 2003/0092591 | A1 | 5/2003 | Ellson et al. | |
| 2003/0162689 | A1* | 8/2003 | Schymitzek ......... | C11D 17/047 510/515 |
| 2004/0087470 | A1 | 5/2004 | Grandmaire et al. | |
| 2004/0087472 | A1 | 5/2004 | Grandmaire et al. | |
| 2004/0087474 | A1 | 5/2004 | Grandmaire et al. | |
| 2004/0087475 | A1 | 5/2004 | Jonke et al. | |
| 2004/0097396 | A1 | 5/2004 | Peters et al. | |
| 2004/0138093 | A1* | 7/2004 | Brain .................. | A61K 8/8158 512/4 |
| 2004/0229769 | A1 | 11/2004 | Smith et al. | |
| 2005/0037944 | A1 | 2/2005 | Grandmaire et al. | |
| 2006/0030516 | A1 | 2/2006 | Demeyere et al. | |
| 2006/0135399 | A1 | 6/2006 | Grandmaire et al. | |
| 2006/0281662 | A1 | 12/2006 | Cheung et al. | |
| 2008/0260716 | A1 | 10/2008 | Kritzler et al. | |
| 2008/0280807 | A1 | 11/2008 | Grainger et al. | |
| 2009/0038083 | A1 | 2/2009 | Roselle et al. | |
| 2009/0178211 | A1 | 7/2009 | Wahl et al. | |
| 2009/0203570 | A1 | 8/2009 | Behal et al. | |

(Continued)

FOREIGN PATENT DOCUMENTS

| | | | |
|---|---|---|---|
| EP | 1149891 | A1 | 10/2001 |
| EP | 1806392 | A1 | 7/2007 |

(Continued)

OTHER PUBLICATIONS

Acusol Pro Polymer Guide, DOW, pp. 1-4.
Ashland Home Care Product Guide, Ashland.com/homecare, pp. 1-16, 2022.
Cellosize TM QP100 Technical Data Sheet, Dow, pp. 1-5, 2020.
Cellulon TM Fermentation Derived Cellulose, CP Kelco, pp. 1-9, 2020.
Coltide TM HSi Technical Data Sheet, Croda, pp. 1-10, England, 2020.

(Continued)

*Primary Examiner* — Lorna M Douyon
(74) *Attorney, Agent, or Firm* — Norris McLaughlin, PA

(57) ABSTRACT

Compositions are disclosed comprising approximately 2% wt to approximately 8% wt of a benzyl-substituted quaternary ammonium compound, approximately 0.3% wt to approximately 1.5% wt of an alkylamine oxide, and approximately 0.4% wt to approximately 1% wt of phenoxyethanol. The disclosed compositions provide improved reduction in bacteria and viruses during the last rinse cycle of an automatic laundry machine while also providing fabric protection.

17 Claims, No Drawings

(56) References Cited

U.S. PATENT DOCUMENTS

| | | | | |
|---|---|---|---|---|
| 2011/0269663 | A1 | 11/2011 | Clowes et al. | |
| 2011/0311600 | A1 | 12/2011 | Polzin et al. | |
| 2012/0171267 | A1 | 7/2012 | Cunningham et al. | |
| 2012/0192361 | A1 | 8/2012 | Janszen et al. | |
| 2013/0035396 | A1 | 2/2013 | Moen et al. | |
| 2013/0059767 | A1 | 3/2013 | Subramanyam et al. | |
| 2014/0315779 | A1 | 10/2014 | Zander | |
| 2014/0343168 | A1 | 11/2014 | Griese et al. | |
| 2014/0366282 | A1 | 12/2014 | Murphey et al. | |
| 2015/0073051 | A1* | 3/2015 | Cohen | A01N 47/44 514/643 |
| 2015/0307812 | A1 | 10/2015 | Schramm, Jr. et al. | |
| 2015/0315521 | A1 | 11/2015 | Schramm, Jr. et al. | |
| 2015/0329799 | A1 | 11/2015 | Schramm, Jr. et al. | |
| 2016/0030315 | A1* | 2/2016 | Emiru | A61K 47/14 514/643 |
| 2016/0113854 | A1 | 4/2016 | Hurkens et al. | |
| 2018/0142187 | A1 | 5/2018 | Fossum et al. | |
| 2018/0142188 | A1 | 5/2018 | Fossum et al. | |
| 2018/0245018 | A1 | 8/2018 | Vidal et al. | |
| 2018/0256466 | A1* | 9/2018 | Emiru | A61K 8/678 |
| 2019/0010423 | A1 | 1/2019 | Saveyn et al. | |
| 2019/0124919 | A1 | 5/2019 | Kloeppel et al. | |
| 2019/0307124 | A1 | 10/2019 | Sehgal et al. | |
| 2020/0154704 | A1 | 5/2020 | Ripberger et al. | |
| 2020/0221694 | A1 | 7/2020 | Purschwitz et al. | |
| 2020/0224124 | A1 | 7/2020 | Bautista Cid et al. | |
| 2020/0283707 | A1 | 9/2020 | Dahl et al. | |
| 2020/0369985 | A1 | 11/2020 | Saito et al. | |
| 2020/0385492 | A1 | 12/2020 | Koyama et al. | |
| 2020/0392429 | A1 | 12/2020 | Yamawaki et al. | |
| 2021/0115359 | A1 | 4/2021 | Nagano et al. | |
| 2021/0163854 | A1 | 6/2021 | Tollens et al. | |
| 2021/0219545 | A1 | 7/2021 | Sehgal et al. | |
| 2021/0227830 | A1 | 7/2021 | Herdt et al. | |
| 2021/0251225 | A1 | 8/2021 | Sehgal et al. | |
| 2022/0098515 | A1 | 3/2022 | Yashita et al. | |
| 2022/0135904 | A1 | 5/2022 | Sloan | |
| 2022/0176001 | A1 | 6/2022 | Nguyen et al. | |
| 2022/0195341 | A1* | 6/2022 | McGrane | C11D 1/94 |
| 2022/0228087 | A1 | 7/2022 | Saito et al. | |
| 2022/0233411 | A1 | 7/2022 | Samnani | |
| 2022/0248670 | A1 | 8/2022 | Boardman | |
| 2022/0295789 | A1 | 9/2022 | Sehgal et al. | |
| 2022/0348845 | A1 | 11/2022 | Snow | |
| 2023/0024364 | A1 | 1/2023 | Locher et al. | |
| 2023/0098448 | A1 | 3/2023 | Man et al. | |
| 2023/0099021 | A1 | 3/2023 | Ghosh et al. | |
| 2023/0108533 | A1 | 4/2023 | Asgari et al. | |
| 2023/0111060 | A1 | 4/2023 | Frank et al. | |
| 2023/0131185 | A1 | 4/2023 | Hawkins et al. | |
| 2023/0181738 | A1 | 6/2023 | Rabinovich-Guillat et al. | |
| 2023/0183610 | A1 | 6/2023 | Guisolphe et al. | |
| 2023/0270107 | A1 | 8/2023 | Jiang et al. | |
| 2025/0057157 | A1* | 2/2025 | Crowley | A01N 31/02 |

FOREIGN PATENT DOCUMENTS

| | | | | |
|---|---|---|---|---|
| EP | 3418361 | A1 | 12/2018 | |
| GB | 1260584 | | 1/1972 | |
| GB | 1538094 | | 1/1979 | |
| GB | 2608380 | A | 1/2023 | |
| GB | 2613865 | A | 6/2023 | |
| JP | 2018070831 | A | 10/2018 | |
| JP | 6469949 | B2 | 1/2019 | |
| RU | 2208048 | C2 | 7/2003 | |
| RU | 2235761 | C1 | 9/2004 | |
| WO | 2001030951 | A1 | 5/2001 | |
| WO | 2005059070 | A1 | 6/2005 | |
| WO | 2005059080 | A1 | 6/2005 | |
| WO | 2008135333 | A1 | 11/2008 | |
| WO | 2013005036 | A1 | 1/2013 | |
| WO | 2013156371 | A1 | 10/2013 | |
| WO | 2013174603 | A1 | 11/2013 | |
| WO | 2016135193 | A1 | 9/2016 | |
| WO | 2018108466 | A1 | 6/2018 | |
| WO | 2019015839 | A1 | 1/2019 | |
| WO | 2021079797 | A1 | 4/2021 | |
| WO | 2021116092 | A1 | 6/2021 | |
| WO | 2021156297 | A1 | 8/2021 | |
| WO | WO-2021191413 | A1 * | 9/2021 | A61Q 19/10 |
| WO | 2021230766 | A1 | 11/2021 | |
| WO | WO 2021/241851 | * | 12/2021 | |
| WO | 2022038630 | A1 | 2/2022 | |
| WO | 2022192147 | A1 | 9/2022 | |
| WO | 2023275536 | A1 | 1/2023 | |
| WO | 2023036940 | A1 | 3/2023 | |
| WO | 2023120178 | A1 | 6/2023 | |

OTHER PUBLICATIONS

"Formulating elegant liquid and semisolid drug products", Natrosol 250, Ashland.com, 2018, pp. 1-32.

"Ethanaminium, 2-hydroxy-N, N-bis(2-hydroxyethyl)-N-methyl-, esters with C16-18 and C18-unsatd. fatty acids, Me sulfates (salts)", Stepantex Review, National Industrial Chemicals Notification and Assessment Scheme, Australian Government, Department of Health, Commonwealth of Australia, Oct. 2018, pp. 1-56.

Rewoquat TM WE-45 Technical Data Sheet, Evonik Industries AG, Feb. 2012, pp. 1-3.

Supracare TM 780Additive Technical Data Sheet, Dow Chemical Company, 2021, pp. 1-6.

GB Search Report for related application GB 2306664.0 dated Oct. 23, 2023.

GB Search Report for related application GB 2305899.3 dated Oct. 24, 2023.

* cited by examiner

LAUNDRY SANITIZING AND SOFTENING COMPOSITIONS

TECHNICAL FIELD

Compositions are disclosed comprising approximately 2% wt to approximately 8% wt of a benzyl-substituted quaternary ammonium compound, approximately 0.3% wt to approximately 1.5% wt of an alkylamine oxide, and approximately 0.4% wt to approximately 1% wt of phenoxyethanol. The disclosed compositions provide improved reduction in bacteria and viruses during the last rinse cycle of an automatic laundry machine while also providing fabric protection.

BACKGROUND

Consumers have increased interest in washing laundry under energy and water efficient conditions due to environmental concerns. Consumers also have increased interest in washing with reduced environmental impact. For example, some consumers use less environmentally harmful laundry detergents and fabric softeners. Consumers are also interested in washing laundry at cooler temperatures, with less water, and with milder laundry formulations. Washing laundry under these conditions raises concerns that the resulting items may be visibly clean but may be unhygienic because they may still harbor pathogens. Therefore, there is a growing demand for laundry sanitizing compositions to ensure that clean laundry harbors fewer pathogens. However, laundry sanitizing compositions are added to the fabric softener drawer of the washing machine, making it difficult to use both laundry sanitizing compositions and fabric softener compositions in the same wash cycle.

Lysol® Laundry Sanitizer (LLS) is a commercially available product that is used for sanitizing clean laundry. LLS contains the dialkyl ($C_{8-10}$) dimethylammonium chloride (DDAC), benzyl-$C_{12-18}$-alkyldimethyl ammonium chloride (ADBAC), and an alcohol alkoxylate nonionic surfactant. About 150 mL of LLS is added to the fabric softener drawer of the top-load washing machine for use in the washing machine rinse cycle (100 mL is added for front-loaders). LLS kills 99.9% of bacteria (i.e., a 3-$\log_{10}$ reduction in bacteria) in laboratory tests.

WO2023/036940 to Rhodia Operations discloses an antimicrobial composition comprising a first antimicrobial agent selected from the group consisting of benzalkonium salts, trilocarban, diclosan, triclosan, or combinations thereof, and a second antimicrobial agent which is a cationic polymer (known as polyquaternium 2) having a weight average molecular weight of 1,000 to 50,000 represented by the general formula (I):

(I)

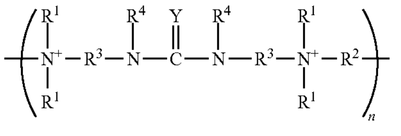

US2022/233411 to Godrej Consumer Products Ltd discloses a reconstitutable sanitizer formulation which is non-alcoholic in nature and achieves up to 99.9% reduction in microbial load and provides long-lasting protection against microbes for 2-6 hours.

WO2021/156297 to Arch UK Biocides Ltd discloses laundry sanitizing compositions containing a biocide agent and an acidic buffering system.

WO2020/168046 to Rhodia Operations discloses microbial compositions that include an antimicrobial component having at least one quaternary ammonium compound; a synthetic polymer, such as PQ5, PQ7, PQ11, or PQ28; an organic acid; a surfactant selected from cationic surfactants, amphoteric surfactants, and combinations thereof; and at least one non-ionic surfactant.

WO2019/015839 to Henkel AG & Co. KGAA discloses aqueous cleaning agents comprising at least one cationic surfactant comprising at least one quaternary ammonium compound, at least one nonionic surfactant comprising at least one amine oxide, at least one alcohol, optional additives, and water.

WO2018/108466 to Unilever PLC discloses a biocidal composition comprising one or more water soluble quaternary ammonium compounds and one or more water soluble organic hydroxy acids. 2 to 100 mL of the composition is added to the rinse aid dispenser of an automatic washing machine, optionally together with a dose of liquid fabric conditioner in the same dispensing compartment.

WO2014/092693 to Colgate-Palmolive Company discloses a composition comprising a cationic surfactant and an esterquat that is a quaternized reaction product of an alkanol amine and a fatty acid wherein from at least 90 wt % to up to 100 wt % of the esterquat is comprised of triesterquat and from 0 wt % to up to 10 wt % of the esterquat is comprised of at least one of monoesterquat and diesterquet. The composition may be used to soften fabric or increase fragrance delivery.

WO2013/124784 to BASF (China) Company Limited discloses compositions comprising a) an antimicrobial agent selected from the group consisting of biocides containing halogen atoms and/or containing phenolic moieties, formic acid, chlorine dioxide, chlorine dioxide generating compounds, dialdehydes, components containing an antimicrobial metal, such as antimicrobial metal, and b) a polymine, especially polyethyleneimine.

WO2013/017967 to Kimberly-Clark Worldwide Inc. discloses antimicrobial cleansing compositions including a polar carrier solvent, a cationic compatible surfactant, a quaternary ammonium biocide, and a cationic compatible afterfeel agent.

WO2012/090100 to Kimberly-Clark Worldwide, Inc. discloses durable antimicrobial compositions comprising a carbonate/bicarbonate salt of a quaternary ammonium cation, an organic acid, hydrogen peroxide and a cationic polymer, namely WO2012/080918 to Ecolab USA Inc discloses anti-microbial compositions comprising a quaternary ammonium compound and a cationic biocide.

WO2011/149475 to Colgate-Palmolive Company discloses a composition comprising an esterquat that is a quaternized reaction product of an alkanol amine and a fatty acid. Methods of softening fabric and increasing fragrance delivery by treating fabric with the compositions are also disclosed.

WO2007/104387 to Hindustan Unilever Ltd discloses a fabric conditioner composition comprising 0.1-20% by weight cationic fabric conditioner active, 0.1-10% organic acid having 1 to 8 carbon atoms, and 0.1-5% anion quencher selected from a mono-long chain quaternary ammonium compound having the formula $R(R^1)_3N^+X^-$, wherein R is $C_{8-22}$ alkyl or alkenyl, $R^1$ is a $C_1$-$C_3$ alkyl, and X is an anionic selected from chloride, bromide iodide, nitrate, sulfate, methyl sulfate, ethyl sulfate, acetate, ad phosphate, or an alkyl benzyl quaternary ammonium compound having the formula $R^2R^3(R^4)_2N^+X^-$, wherein $R^2$ is a $C_{6-18}$ alkyl or alkenyl group, $R^3$ is a benzyl group, and $R^4$ is a $C_1$-$C_3$ alkyl group.

WO2006/094582A1 to Unilever PLC discloses aqueous fabric softening compositions having good high temperature stability comprising a cationic fabric softening compound and water soluble polysaccharide polymers.

US2005/037944 to Grandmaire et al. discloses a medium viscosity, clear fabric softening composition comprising form about 1 to 20 wt % of an oligomeric esterquat, at least about 0.2% wt dipropylene glycol, an effective amount of a water insoluble perfume, and an effective amount of a thickening agent to provide a viscosity of from 80 to 700 m-Pas.

WO2002/072745 to The Procter & Gamble Company discloses a rinse added composition for the conditioning of fabric in a rinse, the composition comprising a fabric softener active, a suds suppressing system, and a surfactant scavenger.

WO2001/30951 to Reckitt Benckiser France discloses a washing and conditioning method using, in the main wash, one or more cleansing surfactants and one or more organic quaternary ammonium polymers.

EP1149891 to Goldschmidt Chemical Company discloses a low cost fabric softener for rinse cycle comprising a blend of a triglyceride-based ester quat and quaternary ammonium anionic scavenger.

WO 96/21715 to The Procter & Gamble Company discloses concentrated liquid fabric softener compositions stabilized by means of water-soluble polyesters.

U.S. Pat. No. 4,476,030 to Hoescht Aktiengesellschaft discloses concentrated masterbatches of fabric softeners.

U.S. Pat. No. 3,349,033 to Zuccarelli discloses stable laundry softeners having microbiologically active properties.

There remains a need for laundry softener compositions that also provide germ kill.

It is an object of the invention to provide a laundry softener composition that also provides germ kill during a laundry rinse cycle, while being safer for the environment.

SUMMARY OF INVENTION

Disclosed are compositions comprising approximately 2% wt to approximately 8% wt of a benzyl-substituted quaternary ammonium compound, approximately 0.3% wt to approximately 1.5% wt of an alkylamine oxide, and approximately 0.4% wt to approximately 1% wt of phenoxyethanol. The disclosed compositions may include one or more of the following aspects:

- the composition being a laundry composition;
- the laundry composition being a biocide;
- the laundry composition being a sanitizer;
- the laundry composition being a conditioner;
- the laundry composition being a fabric protector;
- the laundry composition being a fabric protector and biocide;
- the laundry composition being a fabric protector and sanitizer;
- the laundry composition being a conditioner and biocide;
- the laundry composition being a conditioner and sanitizer;
- the laundry composition comprising only one benzyl-substituted quaternary ammonium compound;
- the benzyl-substituted quaternary ammonium compound being substantially free of ester ligands;
- the benzyl-substituted quaternary ammonium compound being substantially free of alkoxy ligands;
- the benzyl-substituted quaternary ammonium compound being $C_{12-16}$ alkyl dimethyl benzyl ammonium chloride;
- the benzyl-substituted quaternary ammonium compound being $C_{12-18}$ alkyl dimethyl benzyl ammonium chloride;
- the composition comprising between approximately 4% wt and approximately 7% wt benzyl-substituted quaternary ammonium compound;
- the composition comprising between approximately 4.5% wt and approximately 6.5% wt benzyl-substituted quaternary ammonium compound;
- the composition comprising between approximately 4% wt and approximately 7% wt $C_{12-18}$ alkyl dimethyl benzyl ammonium chloride;
- the composition comprising between approximately 4% wt and approximately 7% wt $C_{12-16}$ alkyl dimethyl benzyl ammonium chloride;
- the composition comprising between approximately 4.5% wt and approximately 6.5% wt $C_{12-18}$ alkyl dimethyl benzyl ammonium chloride;
- the composition comprising between approximately 4.5% wt and approximately 6.5% wt $C_{12-16}$ alkyl dimethyl benzyl ammonium chloride;
- the composition comprising between approximately 0.4% wt to approximately 1% wt of an alkylamine oxide;
- the composition comprising between approximately 0.3% wt to approximately 1.5% wt of a $C_{10-14}$ alkylamine oxide;
- the composition comprising between approximately 0.4% wt to approximately 1% wt of a $C_{10-14}$ alkylamine oxide;
- the composition comprising between approximately 0.3% wt to approximately 1.5% wt of a lauramine oxide;
- the composition comprising between approximately 0.4% wt to approximately 1% wt of a lauramine oxide;
- the composition comprising between approximately 0.3% wt to approximately 1.5% wt of a decyl amine oxide;
- the composition comprising between approximately 0.4% wt to approximately 1% wt of a decyl amine oxide;
- the composition comprising between approximately 0.45% wt to approximately 0.75% wt of phenoxyethanol;
- further comprising water;
- further comprising approximately 80% wt to approximately 97.5% wt water;
- further comprising approximately 85% wt to approximately 95% wt water;
- the composition being a liquid;
- the composition being a single-phase liquid;
- the composition being a clear single-phase liquid;
- the single-phase liquid composition being acidic;
- the composition having a pH ranging from approximately 2 to approximately 4;
- the composition having a pH ranging from approximately 2.5 to approximately 3;
- further comprising a liquid ethoxyquat;
- further comprising a non-polymeric alkoxy quaternary ammonium salt;
- the liquid non-polymeric alkoxy quaternary ammonium salt being N,N'-di(alkylcarboxyethyl)-N-hydroxyethyl-N-methylammonium sulfate;
- the composition comprising between approximately 2% wt and approximately 5% wt liquid non-polymeric alkoxy quaternary ammonium salt;

the composition comprising between approximately 3% wt and approximately 4% wt liquid non-polymeric alkoxy quaternary ammonium salt;

the liquid non-polymeric alkoxy quaternary ammonium salt being a fabric protector;

further comprising a polar carrier solvent;

the polar carrier solvent being methanediol, 1,2-propanediol, 1,3-propanediol, 1,2-butanediol, 1,3-butanediol, 1,4-butanediol, 2,3-butanediol, polyethyelene glycol, polypropylene glycol, glycerin, ethylene glycol mono hexyl ether, propylene glycol phenyl ether, water, or combinations thereof;

the polar carrier solvent being 1,2-propanediol, 1,3-propanediol, glycerin, ethylene glycol mono hexyl ether, propylene glycol phenyl ether, water, and combinations thereof;

the polar carrier solvent being 1,2-propanediol, 1,3-propanediol, glycerin, and combinations thereof;

the polar carrier solvent being ethylene glycol mono hexyl ether, propylene glycol phenyl ether, and combinations thereof;

the polar carrier solvent being ethylene glycol mono hexyl ether;

the polar carrier solvent being propylene glycol phenyl ether;

the composition comprising between approximately 0.1% wt to approximately 2.5% wt of non-aqueous polar carrier solvent;

the composition comprising between approximately 0.25% wt to approximately 2% wt of a non-aqueous polar carrier solvent;

further comprising a cellulose based thickener;

the cellulose based thickener being carboxymethyl cellulose, hydropropylmethylcellulose, hydroxyethylcellulose, methylhydroxyethylcellulose, fermentation-derived cellulose, or combinations thereof;

the cellulose based thickener being hydroxyethylcellulose;

the cellulose based thickener being methylhydroxyethylcellulose;

the composition transforming from a single phase liquid to a colloid after addition of the thickener;

the composition comprising between approximately 0.1% wt and approximately 0.5% wt thickener;

the composition comprising between approximately 0.25% wt and approximately 0.45% wt thickener;

the composition exhibiting an approximately 50% to 90% decrease in viscosity over approximately 2 years time, as measured after 60 seconds at 100 RPM using a LV62 spindle at ambient temperature;

the composition exhibiting an approximately 65% to 85% decrease in viscosity over approximately 2 years time, as measured after 60 seconds at 100 RPM using a LV62 spindle at ambient temperature;

further comprising an opacifier;

the opacifier being an opacifier blend of cocamidopropyl betaine, glycol distearate, and sodium benzoate;

the opacifier blend sold by Solvay under the tradename Miracare™ OPR2, previously known as Mackadet™ OPR2;

the composition comprising between approximately 0.05% wt to approximately 0.5% wt opacifier;

further comprising a polymer to suspend the opacifier;

the polymer being poly(2-methacryloxyethyltrimethylammonium chloride);

the polymer being poly(diallylmethylammonium chloride);

the composition comprising between approximately 1% wt to approximately 3% wt polymer;

the composition comprising between approximately 1.5% wt to approximately 2.5% wt polymer;

further comprising a polymer to enhance microefficacy;

the polymer being selected from the group consisting of poly(diallyldimethylammonium chloride) (PQ6) having a molecular weight <100 kDa (PQ6<100 kDa); PQ6 having a molecular weight ranging from 200 kDa to 300 kDa (PQ6 200-300 kDa); PQ6 having a molecular weight ranging from 400 kDa to 500 kDa (PQ6 400-500 kDa); copolymers of vinylpyrrolidone (VP) and quaternized vinylimidazole (QVI) (PQ16) having 5% wt VP and 95% wt QVI (PQ16 5VP-95QVI); PQ16 having 50% wt VP and 50% wt QVI (PQ16 50VP-50QVI); Poly(2-dimethylamino)ethyl methacrylate)methyl chloride quaternary salt (PQ37); 1-propanaminium, N,N,N-trimethyl-3-[(1-oxo-2-propenyl) amino] chloride, homopolymer (A1000); 1-dodecanaminium, N,N-dimethyl-N-[3-[(2-methyl-1-oxo-2-propen-1-yl)amino]propyl]-, chloride (1:1), polymer with sodium 2-methyl-2-[(1-oxo-2-propen-1-yl)amino]-1-propanesulfonate (1:1) and N,N,N-trimethyl-3-[(1-oxo-2-propen-1-yl)amino]-L propanaminium chloride (1:1) (C113); and combinations thereof;

the polymer being PQ6<100 kDa, PQ6 200-300 kDa, PQ6 400-500 kDa, PQ16 5VP-95QVI, A1000, C113, or combinations thereof;

the polymer being PQ6<100 kDa, PQ6 200-300 kDa, or combinations thereof;

the polymer being PQ6<100 kDa;

the polymer being PQ6 200-300 kDa;

the polymer being PQ6 400-500 kDa;

the polymer being PQ16 5VP-95QVI;

the polymer being PQ16 50VP-50QVI;

the polymer being PQ37;

the polymer being A1000;

the polymer being C113;

the composition being substantially free of a polymer selected from the group consisting of poly(acrylamide-co-diallyldimethylammonium chloride (PQ7), copolymers of vinylpyrrolidone and quaternized vinylimidazole having more vinylpyrrolidone units than quaternized vinylimidazole units (PQ16 70VP-30QVI), 2-pyrrolidinone, 1-ethenyl-polymer with N,N,N-trimethyl-3-[(2-methyl-1-oxo-2-propenyl)amino]-1-propanium chloride (PQ28), and combinations thereof;

the composition being substantially free of betaine surfactants the composition being substantially free of enzymes;

the composition being substantially free of a copolymer of acrylamide and diallyldimethylammonium chloride;

the composition being substantially free of an added electrolyte, such as sodium chloride;

the composition being substantially free of chelant;

the composition being substantially free of anionic surfactant;

the composition being substantially free of alkanolamine, such as monoethanolamine, diethanolamine, triethanolamine, or combinations thereof;

the composition being substantially free of glycol ether;

the composition being substantially free of peroxide;

the composition being substantially free of anionic surfactants;

the composition being substantially free of bisguanide;

the composition being substantially free of added alcohol;

the composition being substantially free of added ethanol;

the composition being substantially free of a copolymer of vinylpyrrolidone and quaternized vinylimidazole;

the composition being substantially free of an unsaturated fatty alcohol;

the composition comprising between approximately 0.25% wt and approximately 2% wt of amine oxides;

the composition comprising between approximately 0.5% wt and approximately 3% wt of polyquaternium-6;

the composition comprising between approximately 1% wt and approximately 3% wt of ethylene glycol monohexyl ether.

Also disclosed are methods of sanitizing and conditioning fabrics. Any of the compositions disclosed above are diluted with water to produce a diluted composition. The fabric to be treated is contacted with the diluted composition. The disclosed methods may include one or more of the following aspects:

adding 125 mL to 300 mL of any of the compositions disclosed above to the rinse aid dispenser or directly to the rinse cycle of a top loader (47 L $H_2O$);

adding 75 mL to 180 mL of any of the compositions disclosed above to the rinse aid dispenser or directly to the rinse cycle of a top loader (39 L $H_2O$);

adding 250 mL to 350 mL of any of the compositions disclosed above to the rinse aid dispenser or directly to the rinse cycle of a top loader (71 L $H_2O$);

adding 300 mL to 400 mL of any of the compositions disclosed above to the rinse aid dispenser or directly to the rinse cycle of a top loader (89 L $H_2O$);

adding 25 mL to 100 mL of any of the compositions disclosed above to the rinse aid dispenser of a front loader (17 L $H_2O$); and adding 50 mL to 100 mL of any of the compositions disclosed above to one gallon water in a bucket for pre-soak.

Terms and Definitions

As used herein:

the symbol "~" and the terms "approximately" and "about" mean plus or minus 10% of the value stated;

the term "a" or "an" means one or more;

any and all ranges are inclusive of their endpoints, e.g. a ranging from 1 wt % to 10 wt % wt includes 1 wt % and 10 wt % and any concentration between 1 wt % and 10 wt %;

all amounts given in % are % by weight (wt %) unless otherwise stated. When an ingredient does not contain close or equal to 100% active material, two percentages may be provided: one for the weight of the ingredient and one for the weight of the active. For example, 7.28% wt of benzalkonium chloride contains approximately 80% benzalkonium chloride in water, alcohol and/or polypropylene glycol, which equates to approximately 5.82% wt of benzalkonium chloride in the formulation. This would be represented as 7.28% wt (5.82% wt) of benzalkonium chloride;

the term "benzyl group" is $C_6H_5CH_2$—;

the term "comprising" is inclusive or open-ended and does not exclude any additional elements; the term "consisting of" excludes any additional elements; and the term "consisting essentially of" is in-between, only permitting additional elements that do not materially affect characteristics of the product or process;

the phrase "substantially free" means a concentration of less than 0.3 g/L, preferably less than 0.2 g/L, more preferably less than 0.1 g/L, and most preferably less than 0.05 g/L;

the terms "germ" and "microbe" or "microbial" means microorganisms which cause disease or undesirable effects, such as malodor, and encompasses both bacteria and viruses;

the terms "sanitize" or "sanitization" mean providing equal to or greater than a 3 $\log_{10}$ reduction of microbes in 25 minutes according to ASTM 2274, including but not limited to *Staphylococcus aureus* and *Klebsiella pneumoniae;* the terms "disinfect" or "disinfection" mean no growth observed during the micro testing;

the terms "biocide" or "biocidal" mean any product that can kill germs, including bacteria and viruses; biocides are substances approved to kill microorganisms and typically registered with a governing body (i.e., the US Environmental Protection Agency (EPA) or the European Chemicals Agency (ECHA));

the term "liquid" means a state of matter that conforms to the shape of the container in which it is held at room temperature (18-23° C.) and which acquires a defined surface in the presence of gravity; the term "liquid" is readily distinguishable from the terms "solid" and "gas." Liquids are not pastes, which behaves as a solid until a sufficiently large load or stress is applied, even though a paste is also known as a Bingham plastic fluid;

the term "alone" means that no other ingredients are present, in other words, the stated ingredient is the only ingredient;

the term "ambient temperature" means room temperature which may vary depending on the season from approximately 18° C. to approximately 28° C., but preferably from approximately 20° C. to approximately 25° C.

DETAILED DESCRIPTION

Compositions are disclosed comprising approximately 2% wt to approximately 8% wt of a benzyl-substituted quaternary ammonium compound, approximately 0.3% wt to approximately 1.5% wt of an alkylamine oxide, and approximately 0.4% wt to approximately 1% wt of phenoxyethanol.

The disclosed compositions may be used in laundry formats, such as a laundry biocide, a laundry sanitizer, a laundry softener, a laundry condition, a laundry fabric protector, or combinations thereof. Preferably, the disclosed compositions may serve two or more functions. For example, the disclosed composition may be a fabric protector and biocide, or a fabric protector and sanitizer, or a softener and biocide, or a softener and sanitizer, or a conditioner and biocide, or a conditioner and sanitizer. Alternatively, the disclosed composition may be a fabric protector and softener and conditioner. Alternatively, the disclosed composition may be a biocide and sanitizer.

For many consumers, the term "softener" has developed a negative connotation. Many softeners leave fabrics, and even the washing machine, feeling greasy. Athletic-wear or towels treated with softeners sometimes build up a residue that makes the fibers more hydrophobic, which may impair the moisture wicking capability of the fabric. As shown in the examples that follow, testing of the disclosed formulations on cotton and polyester indicate that the ability for the fabric to absorb moisture is not negatively impacted. One of ordinary skill in the art will recognize that most athletic-wear contains polyester, spandex, and/or lycra and most towels contain cotton.

The disclosed compositions reduce and/or remove germs during the last rinse cycle of a laundry machine washing process. The disclosed compositions also reduce and/or remove malodor containing bacteria during the last rinse cycle of a laundry machine washing process. The disclosed compositions remain stable over time.

Industry leaders have predominantly utilized quaternary ammonium compounds (quats) in order to provide consumers with a germ kill benefit. Quats are typically cheap, readily available, and offer a satisfactory level of disinfection to the consumer. Despite these benefits, quats are known to be toxic to aquatic environments with potential long-lasting effects. Even though quats are expected to biodegrade, regulatory bodies (e.g., the US Environmental Protection Agency) may prohibit individuals from making biodegradability claims if these compounds are present in any amount.

The disclosed compositions comprise a low concentration of quats, but are still able to obtain germ kill when diluted during the last rinse cycle of an automatic clothes washing process. The disclosed compositions comprise approximately 2% wt to approximately 8% wt of a benzyl-substituted quaternary ammonium compound, preferably between approximately 4% wt and approximately 7% wt. Benzyl-substituted quaternary ammonium compounds have the formula: $C_6H_5CH_2NR^+X^-$, wherein each R is independently a $C_1$-$C_{18}$ hydrocarbon group and X is an alkali metal, saccharinate group, or carbonate group. R is not an ether or alkoxy group. Preferably the benzyl-substituted quaternary ammonium compound has the formula $C_6H_5CH_2N(CH_3)_2R^+X^-$, wherein R is a C12-C18 or C12-C16 alkyl group and X is Cl.

The disclosed compositions comprise an alkylamine oxide non-ionic surfactant. The alkylamine oxide may be a C10-C14 alkylamine oxide, preferably lauramine oxide, decylamine oxide, or dimethyltetradecylamine oxide; more preferably lauramine oxide or decylamine oxide. The composition may comprise approximately 0.3% wt to approximately 1.5% wt alkylamine oxide, preferably between approximately 0.4% wt to approximately 1% wt. The composition may comprise approximately 0.3% wt to approximately 1.5% wt C10-C14 alkylamine oxide, preferably between approximately 0.4% wt to approximately 1% wt. The composition may comprise approximately 0.3% wt to approximately 1.5% wt lauramine oxide, preferably between approximately 0.4% wt to approximately 1% wt. The composition may comprise approximately 0.3% wt to approximately 1.5% wt decylamine oxide, preferably between approximately 0.4% wt to approximately 1% wt. As shown in the examples that follow, the alkylamine oxide enhances the antimicrobial efficacy of the benzyl-substituted quaternary ammonium compound.

The disclosed compositions comprise phenoxyethanol. The composition may comprise approximately 0.4% wt to approximately 1% wt phenoxyethanol, preferably between approximately 0.45% wt to approximately 0.75% wt. As shown in the examples that follow, the phenoxyethanol enhances the antimicrobial efficacy of the benzyl-substituted quaternary ammonium compound.

The disclosed compositions further comprise between approximately 0.5% wt to approximately 1% wt citric acid, preferably between approximately 0.6% wt to approximately 0.9% citric acid. Citric acid serves as both an acidifier and chelant. As a result, the disclosed compositions may be substantially free of any additional chelant besides the citric acid, such as EDTA, GLDA, etc. Citric acid may also further enhance the antimicrobial efficacy of the benzyl-substituted quaternary ammonium compound.

The disclosed compositions also include water, preferably between approximately 80% wt to approximately 97.5% wt water. As a result, the disclosed compositions are liquid. The pH of the disclosed compositions measured neat at 20° C. ranges from approximately 2 to approximately 4, preferably from approximately 2.5 to approximately 3. This pH range provides improved antimicrobial efficacy to the benzyl-substituted quaternary ammonium compounds. This pH range may also contribute to improved limescale removal as compared to compositions at higher pH ranges. Limescale traps dirt, odors, and germs. As a result, the removal of limescale from fabrics at pH 2-4 provides heightened freshness of the fabrics.

The compositions disclosed above comprise all the ingredients necessary for germ kill and may serve as a biocide and sanitizer. These compositions are single-phase liquids at room temperature, preferably clear single-phase liquids.

The disclosed compositions do not include any other known germ kill actives in order to achieve germ kill. In other words, the disclosed compositions do not include any additional quaternary ammonium compounds, such as dialkyl dimethyl ammonium chloride. The benzyl-substituted quaternary ammonium compound is the only quat used in the disclosed compositions. Multiple quaternary ammonium species may help achieve sanitization and/or provide better breadth of germ kill. As a result, most commercial sanitizers include a blend of two or more quaternary ammonium compounds. As shown in the examples that follow, Applicant has surprisingly discovered that a composition comprising only the benzyl-substituted quaternary ammonium compound may achieve better than or equivalent germ kill to a composition comprising a multi-quat system.

Applicant also believes that using the benzyl-substituted quaternary ammonium compound as the only quat provides an improved safety profile as compared to products containing two or more quaternary ammonium compounds. In vitro epiderm assays were performed on four different compositions containing: (a) 3.70% wt BKC alone, (b) 5.90% wt BKC alone, (c) 5.90% wt blend of BKC and dodecyl dimethyl ammonium chloride (DDAC), and (d) 3.70% wt blend of BKC and DDAC. The results for (a) and (b) were "non-corrosive." The results for (d) were "borderline." The results for (c) were "Corrosive." Applicant was surprised to discover that less damaging results were achieved from concentrations of BKC that are the same or even higher than the concentrations of a combination of BKC and DDAC.

The disclosed compositions are also substantially free of peroxides, such as hydrogen peroxide or peracids. The disclosed compositions are also substantially free of guanides, such as bisguanide. The disclosed compositions are substantially free of alkali metal hypochlorites. The disclosed compositions are substantially free of isocyanurates. The disclosed compositions are also substantially free of borates, such as boric acid or perborates.

The disclosed compositions may also be substantially free of any polyquaternium polymers. As shown in the examples that follow, suitable germ kill is obtained from compositions comprising the benzyl-substituted quaternary ammonium compound alone. However, as will be discussed in more detail infra, addition of some polyquaterniums may also improve germ kill.

To improve functionality of the disclosed compositions, a fabric softener, conditioner, and/or protector may be added. The disclosed compositions may comprise approximately 2% wt to approximately 5% wt, preferably from approximately 3% wt to approximately 4% wt, of this material.

The fabric softener, conditioner, and/or protector may be stearyldimonium hydropropyl hydrolyzed wheat protein. One exemplary commercial stearyldimonium hydropropyl hydrolyzed wheat protein suitable for use in the teachings herein is the stearyldimonium hydropropyl hydrolyzed wheat protein sold by Croda under the tradename Coltide™ HQS.

Alternatively, the fabric softener, conditioner, and/or protector may be a copolymer of hydrolyzed wheat protein and silicone. One exemplary commercial copolymer suitable for use in the teachings herein is the hydrolysed wheat protein and silicone sold by Croda under the tradename Coltide™ HSi.

In another alternative, the fabric softener, conditioner, and/or protector may be a liquid ethoxyquat, particularly a non-polymeric alkoxy quaternary ammonium salt. The liquid non-polymeric alkoxy quaternary ammonium salt may be N,N'-di(alkylcarboxyethyl)-N-hydroxyethyl-N-methylammonium sulfate. One exemplary commercial source of N,N'-di(alkylcarboxyethyl)-N-hydroxyethyl-N-methylammonium sulfate is Rewoquat™ WE 45 (75% in ethanol) from Evonik. This water soluble ethoxyquat permits formulation of single-phase liquids at room temperature, preferably clear single-phase liquids. Applicant believes that this softener may chemically bind with the fabric, rather than forming a coating on the fabric. This mechanism leaves clothes feeling soft without having a greasy residue, even after multiple washes. This mechanism may also permit the use of a lower concentration of fabric softener than is traditionally used, while maintaining or even exceeding softness feel.

In another alternative, the disclosed compositions are substantially free of any ethoxyquats.

To improve aesthetics of the disclosed compositions, a polysaccharide, particularly a cellulose based material, may be added. The polysaccharide or cellulose based material may serve as a thickener. The polysaccharide or cellulose based material may serve as a suspending agent. The polysaccharide or cellulose based material may serve as a softener. The polysaccharide or cellulose based material may be carboxymethyl cellulose, hydroxyethylcellulose, hydropropylmethylcellulose, methylhydroxyethylcellulose, xanthan gum, a fermentation derived cellulose, or combinations thereof. The disclosed compositions comprise between approximately 0.1% wt and approximately 0.5% wt cellulose based material, preferably between approximately 0.25% wt and approximately 0.45% wt.

Addition of the cellulose based material may transform the disclosed compositions from single phase liquids to a colloidal system. After addition of the cellulose based material, the disclosed compositions have an initial viscosity of approximately 200 cPs as measured after 60 seconds at 100 RPM using a LV62 spindle at ambient temperature.

The viscosity of traditional fabric softeners typically increases with time. Thickening may also occur on exposure to high temperatures or freeze/thaw conditions. Thickened fabric softeners may become unusable for the consumer without the added step of diluting (and reducing effectiveness).

As shown in the stability testing examples that follow, Applicant expects the viscosity of the disclosed compositions to remain close to the initial viscosity or decrease slightly over time. Applicant expects the viscosity of the disclosed composition to remain within approximately 50% to 90% of the initial viscosity over approximately 2 years time, preferably within approximately 65% to 85% of the initial viscosity. As a result, the disclosed compositions may be used in hot climates or subject to freeze/thaw conditions or even just kept on the shelf for longer than traditional fabric softeners without encountering the thickness issues.

The cellulose based material may be hydroxyethylcellulose. One exemplary commercial hydroxyethylcellulose suitable for use in the teachings herein is hydroxyethylcellulose sold by Dow under the tradename Cellosize™ QP100. A 1% wt solution of the cellulose based material has a viscosity ranging from approximately 4,400 cPs to approximately 6,000 cPs as measured using a Brookfield viscometer at 25° C. The cellulose based material has a bulk density ranging from approximately 0.3 g/cm$^3$ to approximately 0.6 g/cm$^3$. The hydroxyethylcellulose functions mainly as a thickener.

Another exemplary commercial hydroxyethylcellulose suitable for use in the teachings herein is hydroxyethylcellulose sold by Ashland under the tradename Natrosol™ 250 HHR. This hydroxyethylcellulose is water soluble. As a result, the disclosed compositions remain single phase solutions. As shown in the examples that follow, single phase solutions typically exhibit better stability than emulsions. Many commercially available fabric softeners are emulsions. This hydroxyethylcellulose is also nonionic and unaffected by cations. As a result, this hydroxyethylcellulose does not negatively impact the biocidal efficacy of the benzyl-containing quaternary ammonium compound. This hydroxyethylcellulose functions mainly as a thickener, giving the disclosed composition viscosity.

The cellulose based material may be methylhydroxyethylcellulose. One exemplary commercial methylhydroxyethylcellulose suitable for use in the teachings herein is the methylhydroxyethylcellulose sold by Dow under the tradename SupraCare™ 780. A 1% wt solution of the cellulose based material has a viscosity ranging from approximately 12,000 cPs to approximately 16,000 cPs as measured using a Haake Roto Visco RV 100 with a shear rate of 2.55 $S^{-1}$ at 20° C. A 1% wt solution of the cellulose based material has a pH ranging from approximately 6 to approximately 7 at 20° C. The methylhydroxyethylcellulose functions mainly as a thickener.

The cellulose based material may be a fermentation derived cellulose. One exemplary commercial fermentation derived cellulose suitable for use in the teachings herein is a fermentation derived cellulose sold by CP Kelco under the tradename Cellulon™ RC-76. Another exemplary commercial fermentation derived cellulose suitable for use in the teachings herein is the fermentation derived cellulose sold by CP Kelco under the tradenames Cellulon™ $R^{88}$ or Cellulon™ $R^{93}$. The fermentation derived celluloses are particularly useful for suspending materials, such as encapsulated fragrances or opacifiers that are frequently included in laundry formulations. The fermentation derived celluloses may be used as both the thickening and suspending agent. Alternatively, the disclosed compositions may comprise approximately 0.75% wt to approximately 3% wt of the fermentation derived cellulose acting as a suspending agent combined with approximately 0.1% wt to approximately 0.5% wt of a hydroxyethylcellulose thickening agent.

The cellulose based material may be a blend of hydropropylmethylcellulose, xanthan gum, and cetyl-hydroxy ethyl cellulose. This blend is commercially available from Ashland under the tradename Ecothix™. This blend also provides a softening benefit to fabrics. This blend may be used alone as both a thickening and softness agent. Alternatively, a low concentration of this blend may be used as a softener with another cellulose serving as the thickener. For example, the disclosed compositions may comprise approximately 0.05% wt to approximately 0.25% wt of this blend with approximately 0.45% wt to approximately 0.75% wt of a methylhydroxyethylcellulose thickening agent.

In addition to water, the disclosed composition may comprise a polar carrier solvent. Exemplary polar carrier solvents include methanediol, 1,2-propanediol, 1,3-propanediol, 1,2-butanediol, 1,3-butanediol, 1,4-butanediol, 2,3-butanediol, polyethyelene glycol, polypropylene glycol, propylene glycol phenyl ether, ethylene glycol monohexyl ether, glycerin, water, or combinations thereof. Preferably polar carrier solvents include 1,2-propanediol, 1,3-propanediol, glycerin, ethylene glycol mono hexyl ether, propylene glycol phenyl ether, water, and combinations thereof. The disclosed compositions comprise between approximately 0.1% wt to approximately 2.5% wt of non-aqueous polar carrier solvent, preferably between approximately 0.25% wt to approximately 2% wt of a non-aqueous polar carrier solvent. One of ordinary skill in the art will recognize that many raw materials are supplied in non-aqueous polar carrier solvents. As a result, the disclosed composition may comprise between approximately 0.25% wt to approximately 1% wt of added non-aqueous polar carrier solvent, such as propylene glycol (i.e., 1,2-propanediol), preferably between approximately 0.3% wt to approximately 0.75% wt. The non-aqueous polar solvent may enhance stability of the disclosed compositions at low temperatures. As shown in the examples that follow, certain polar solvents, such as propylene glycol phenyl ether or ethylene glycol monohexyl ether, have been shown to improve micro efficacy of the benzyl-substituted quaternary ammonium compounds. Applicants further believe that ethylene glycol monohexyl ether may improve the wettability of the fabric. Ethylene glycol monohexyl ether may also improve penetration of the benzyl-substituted quaternary ammonium compound into the fabric fibers, where germs may be hiding.

Alternatively, the disclosed compositions may be substantially free of non-aqueous solvents, such as glycol ethers. The disclosed compositions may also be substantially free of added alcohols, such as ethanol. One of ordinary skill in the art will recognize that the benzyl-substituted quaternary ammonium compounds are frequently supplied in an alcohol or glycol solvent. However, more of these solvents are not deliberately added to the disclosed compositions.

The disclosed compositions may further comprise an encapsulated fragrance. The encapsulated fragrances are suspended in the disclosed compositions. Encapsulated fragrances provide long term fragrance benefits to fabrics. The encapsulated fragrance is captured in the fabric during the rinse process and releases the fragrance when the encapsulate degrades with time or bursts from pressure. Many classical encapsulated fragrances utilized shells that release formaldehyde. Exposure to formaldehyde may cause adverse health effects. Therefore, the disclosed compositions are substantially free of any encapsulated fragrances that release formaldehyde. Preferably, the fragrance is encapsulated by a polyacrylate or biodegradable shell.

Applicant believes that the disclosed compositions provide improved deposition of encapsulated fragrances having polyacrylate shells or any other shells having a negative charge. Applicant theorizes that the positively charged benzyl-substituted polyquaternium compound binds to both the negative charge of the polyacrylate shell and to fiber sites on the clothing, leading to improved fragrance deposition. In R&D testing, this theory was partially confirmed by testing that demonstrated improved encapsulated fragrance deposition from increasing concentrations of BKC.

One of ordinary skill in the art will recognize that dispersion of both the benzyl-substituted quaternary ammonium compound and the encapsulated fragrance in an acidic aqueous carrier provides potential stability issues. More specifically, the formulation may separate. The disclosed compositions solve these stability issues.

When the disclosed compositions comprise encapsulated fragrances, the resulting composition may be opaque. As a result, the disclosed compositions may be substantially free of any opacifiers. Alternatively, the disclosed compositions may further comprise an opacifier. Opacifiers are added purely for aesthetic reasons to give the appearance of "traditional" fabric conditioners. The disclosed compositions may comprise between approximately 0.1% wt to approximately 0.5% wt opacifier. An exemplary opacifier may be a blend of cocamidopropyl betaine and glycol distearate. This exemplary opacifier is commercially available from Solvay under the tradename Miracare™ OPR2, previously known as Mackadet™ OPR2. Alternatively, the opacifier may be a blend of ethylene distearate and hydroxyethyl stearate sold under the tradename Dapracare™ OPC-1 by Italmatch Chemicals S.p.A. In another alternative, the opacifier may be a blend of ethylene distearate and a nonionic surfactant sold under the tradename Dapracare™ OPC-3 by Italmatch Chemicals S.p.A. In yet another alternative, the opacifier may be PEG-2 stearate sold under the tradename Cithrol™ DEGMS by Croda.

Alternatively, the disclosed compositions may be substantially free of any additional non-ionic surfactants besides the alkylamine oxide. Specifically, the disclosed compositions may be substantially free of betaine surfactants. The disclosed compositions may also be substantially free of unsaturated fatty alcohols.

The disclosed compositions are substantially free of anionic surfactants, such as alkyl sulfates and alkyl ether sulfates.

The disclosed compositions may further comprise enzymes.

Alternatively, the disclosed compositions may be substantially free of enzymes.

The disclosed compositions may be substantially free of alkanolamine, such as monoethanolamine, diethanolamine, triethanolamine, or combinations thereof.

The disclosed compositions may be substantially free of an added electrolyte, such as sodium chloride.

Exemplary laundry compositions comprise approximately 2% wt to approximately 8% wt of a benzyl-substituted quaternary ammonium compound, approximately 0.3% wt to approximately 1.5% wt of an alkylamine oxide, and approximately 0.4% wt to approximately 1% wt of phenoxyethanol.

Exemplary laundry compositions comprise:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Water | ~80 to ~97.5 | ~85 to ~95 |

Applicants believe that when used during the last rinse cycle of a laundry washing process, these laundry compositions obtain a 5 $\log_{10}$ reduction using EN1276 in *Staphylococcus aureus, Enterococcus hirae, Escherichia coli*, and *Pseudomonas aeruginosa* and a 4 $\log_{10}$ reduction using EN1650 in *Candida albicans*. This means the above formulation qualifies as a laundry disinfectant composition under European regulations.

The laundry compositions may further comprise a fabric conditioner, which provides a softness effect to the fabric, for example to cotton fibers. The exemplary laundry compositions may comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Esterquat | ~2 to ~5 | ~3 to ~4 |
| Water | ~80 to ~97.5 | ~85 to ~95 |

For aesthetic reasons, the laundry compositions may further comprise thickeners. The thickeners produce a composition having a viscosity ranging from 100 cPs to 500 cPs as measured using a Brookfield viscometer with LV62 spindle at 50 RPM at ambient temperature. For example, these exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~ 1 |
| Phenoxyethanol | ~0.4 to ~1 | ~0.45 to ~0.75 |
| Citric acid | ~0.5 to ~1 | ~0.6 to ~0.9 |
| Cellulose based thickener | ~0.1 to ~0.5 | ~0.25 to ~0.45 |
| Water | ~80 to ~97.5 | ~85 to ~95 |

Formulations that provide germ kill, viscosity, and softness may comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~ 1 |
| Phenoxyethanol | ~0.4 to ~1 | ~0.45 to ~0.75 |
| Citric acid | ~0.5 to ~1 | ~0.6 to ~0.9 |
| Cellulose based thickener | ~0.1 to ~0.5 | ~0.25 to ~0.45 |
| Esterquat | ~2 to ~5 | ~3 to ~4 |
| Water | ~80 to ~97.5 | ~85 to ~95 |

These formulations remain clear, single phase solutions, particularly when the cellulose based thickener is 2-hydroxyethyl ether cellulose and the esterquat is a liquid N,N'-di(alkylcarboxyethyl)-N-hydroxyethyl-N-methylammonium methyl sulfate. This cellulose and esterquat have been carefully selected to be compatible with the benzyl-substituted quaternary ammonium compound. Neither contains any anionic component that may decrease the efficacy of the BKC. As shown in the examples that follow, the components of this formulation remain stable, with no significant change in physical/chemical properties over time.

For aesthetic reasons, the laundry compositions may further comprise a suspending agent, an opacifier, encapsulated fragrance, or any combination thereof. Encapsulated fragrances in the laundry formulations helps fabrics remain fresh long after washing. For example, these exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Esterquat | ~2 to ~5 | ~3 to ~4 |
| Cellulose based thickener | ~0.1 to ~0.5 | ~0.25 to ~0.45 |
| Fermentation based suspending agent (e.g., Cellulon ™ R93) | ~1 to ~4 | ~1.5 to ~2.5 |
| Opacifier and/or encapsulated fragrance, preferably having a polyacrylate or biodegradable shell (i.e., not formaldehyde-releasing shells) | ~0.05 to ~2 | ~0.07 to ~1.5 |
| Water | ~80 to ~97.5 | ~85 to ~95 |

In another example, the exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~ 1 | ~0.45 to ~0.75 |
| Citric acid | ~0.5 to ~1 | ~0.6 to ~0.9 |
| Esterquat | ~2 to ~5 | ~3 to ~4 |
| Cellulose based thickener | ~0.1 to ~0.5 | ~0.25 to ~0.45 |
| Polyquaternium based suspending agent (e.g., polyquaternium 37) | ~1 to ~3 | ~1.5 to ~2.5 |
| Opacifier and/or encapsulated fragrance, preferably having a polyacrylate or biodegradable shell (i.e., not formaldehyde-releasing shells) | ~0.05 to ~2 | ~0.07 to ~1.5 |
| Water | ~80 to ~97.5 | ~85 to ~95 |

Dye and additional fragrance may be added to improve the aesthetic appeal of the resulting formulation. For example, these exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~ 1 | ~0.45 to ~0.75 |
| Propylene glycol | ~0.25 to ~1 | ~0.3 to ~0.75 |
| Citric acid | ~0.5 to ~1 | ~0.6 to ~0.9 |
| Sodium Hydroxide | ~0.01 to ~0.05 | ~0.02 to ~0.04 |
| Esterquat | ~2 to ~5 | ~3 to ~4 |
| Cellulose based thickener | ~0.1 to ~0.5 | ~0.25 to ~0.45 |
| Fermentation based suspending agent (e.g., Cellulon ™ R93) | ~1 to ~4 | ~1.5 to ~2.5 |
| Opacifier and/or encapsulated fragrance, preferably having a polyacrylate or biodegradable shell (i.e., not formaldehyde-releasing shells) | ~0.05 to ~2 | ~0.07 to ~1.5 |
| Dye | 0 to ~0.002 | ~0.0008 to ~0.0018 |
| Fragrance | 0 to ~2 | ~0.3 to ~1.5 |
| Water | ~80 to ~97.5 | ~85 to ~95 |

In another example, the exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~1 | ~0.45 to ~0.75 |
| Propylene glycol | ~0.25 to ~1 | ~0.3 to ~0.75 |
| Citric acid | ~0.5 to ~1 | ~0.6 to ~0.9 |
| Sodium Hydroxide | ~0.01 to ~0.05 | ~0.02 to ~0.04 |
| Esterquat | ~2 to ~5 | ~3 to ~4 |
| Cellulose based thickener | ~0.1 to ~0.5 | ~0.25 to ~0.45 |
| Polyquaternium based suspending agent (e.g., polyquaternium 37) | ~1 to ~3 | ~1.5 to ~2.5 |
| Oacifier and/or encapsulated fragrance, preferably having a polyacrylate or biodegradable shell (i.e., not formaldehyde-releasing shells) | ~0.05 to ~2 | ~0.07 to ~1.5 |
| Dye | 0 to ~0.002 | ~0.0008 to ~0.0018 |
| Fragrance | 0 to ~2 | ~0.3 to ~1.5 |
| Water | ~80 to ~97.5 | ~85 to ~95 |

Two exemplary methods of making the disclosed compositions are provided in Example 1. The methods of making the disclosed compositions are substantially free of any heating steps, providing for a more cost effective and safe manufacturing process. One of ordinary skill in the art will recognize that each cellulose material may have different hydration procedures and should follow the recommendations provided by the cellulose supplier in order to avoid having "fish-eye" clumps, or agglomerates, in the final formulation.

As shown in the examples that follow, the concentration of benzyl-substituted quaternary ammonium compounds may be reduced when specific polymers are added to the formulation and still provide equivalent germ kill to compositions containing higher concentrations of the benzyl-substituted quaternary ammonium compounds. Benzyl-substituted quaternary ammonium compounds are known to be toxic to aquatic environments. The ability to reduce the concentration of the benzyl-substituted quaternary ammonium compound is therefore beneficial. Additionally, the formulation does not require a large percentage of these polymers, which helps contain formulations costs. The polymer may be selected from the group consisting of poly (diallyldimethylammonium chloride) (PQ6) having a molecular weight <100 kDa (PQ6<100 kDa); PQ6 having a molecular weight ranging from 200 kDa to 300 kDa (PQ6 200-300 kDa); PQ6 having a molecular weight ranging from 400 kDa to 500 kDa (PQ6 400-500 kDa); copolymers of vinylpyrrolidone (VP) and quaternized vinylimidazole (QVI) (PQ16) having 5% wt VP and 95% wt QVI (PQ16 5VP-95QVI); PQ16 having 50% wt VP and 50% wt QVI (PQ16 50VP-50QVI); Poly(2-dimethylamino)ethyl methacrylate) methyl chloride quaternary salt (PQ37); 1-propanaminium, N,N,N-trimethyl-3-[(1-oxo-2-propenyl)amino] chloride, homopolymer (A1000); 1-dodecanaminium, N,N-dimethyl-N-[3-[(2-methyl-1-oxo-2-propen-1-yl)amino]propyl]-, chloride (1:1), polymer with sodium 2-methyl-2-[(1-oxo-2-propen-1-yl)amino]-1-propanesulfonate (1:1) and N,N,N-trimethyl-3-[(1-oxo-2-propen-1-yl)amino]-L propanaminium chloride (1:1) (C113); and combinations thereof Alternative exemplary laundry compositions comprise approximately 2% wt to approximately 6% wt of a benzyl-substituted quaternary ammonium compound, approximately 0.25% wt to approximately 4% wt of the polymer, approximately 0.3% wt to approximately 1.5% wt of an alkylamine oxide, and approximately 0.4% wt to approximately 1% wt of phenoxyethanol.

Exemplary laundry compositions comprise:

| Ingredient | % wt | Preferable % wt |
|---|---|---|
| C12-16 or C12-18 alkyl dimethyl benzyl ammonium chloride | ~2 to ~6 | ~3.5 to ~5.5 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Polymer (e.g., PQ6, A1000, PQ16 5VP-95QVI, PQ16 50VP-50QVI, PQ37, C113, or combos) | ~0.25 to ~4 | ~0.25 to ~1.5 |
| Water | ~80 to ~97.5 | ~85 to ~95 |

When used during the last rinse cycle of a laundry washing process, Applicants believe these laundry compositions obtain a 5 $log_{10}$ reduction as tested according to EN1276 and EN1650 in *Staphylococcus aureus, Enterococcus hirae, Escherichia coli*, and *Pseudomonas aeruginosa* and a 4 $log_{10}$ reduction in *Candida albicans*. This means the above formulation qualifies as a laundry disinfectant composition under European regulations.

The laundry compositions may further comprise a fabric conditioner, which provides a softness effect to the fabric, for example to cotton fibers. The exemplary laundry compositions may comprise, consist essentially of, or consist of:

| Ingredient | % wt | Preferable % wt |
|---|---|---|
| C12-16 or C12-18 alkyl dimethyl benzyl ammonium chloride | ~2 to ~6 | ~3.5 to ~5.5 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Polymer (e.g., PQ6, A1000, PQ16 5VP-95QVI, PQ16 50VP-50QVI, PQ37, C113, or combos) | ~0.25 to ~4 | ~0.25 to ~1.5 |
| Esterquat | ~2 to ~5 | ~3 to ~4 |
| Water | ~80 to ~97.5 | ~85 to ~95 |

For aesthetic reasons, the laundry compositions may further comprise thickeners. The thickeners produce a composition having a viscosity ranging from 100 cPs to 500 cPs as measured using a Brookfield viscometer with LV62 spindle at 50 RPM at ambient temperature. For example, these exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~6 | ~3.5 to ~5.5 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Polymer (e.g., PQ6, A1000, PQ16 5VP-95QVI, PQ16 50VP-50QVI, PQ37, C113, or combos) | ~0.25 to ~4 | ~0.25 to ~1.5 |
| Cellulose based thickener | ~0.1 to ~0.5 | ~0.25 to ~0.45 |
| Water | ~80 to ~97.5 | ~85 to ~95 |

Formulations that provide germ kill, viscosity, and softness may comprise, consist essentially of, or consist of:

| Ingredient | % wt | Preferable % wt |
|---|---|---|
| C12-16 or C12-18 alkyl dimethyl benzyl ammonium chloride | ~2 to ~6 | ~3.5 to ~5.5 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Polymer (e.g., PQ6, A1000, PQ16 5VP-95QVI, PQ16 50VP-50QVI, PQ37, C113, or combos) | ~0.25 to ~4 | ~0.25 to ~1.5 |
| Cellulose based thickener | ~0.1 to ~0.5 | ~0.25 to ~0.45 |
| Esterquat | ~2 to ~5 | ~3 to ~4 |
| Water | ~80 to ~97.5 | ~85 to ~95 |

These formulations remain clear, single phase solutions, particularly when the cellulose based thickener is 2-hydroxyethyl ether cellulose and the esterquat is a liquid N,N'-di(alkylcarboxyethyl)-N-hydroxyethyl-N-methylammonium methyl sulfate.

For aesthetic reasons, the laundry compositions may further comprise a suspending agent and an opacifier or encapsulated fragrance. Encapsulated fragrances in the laundry formulations helps fabrics remain fresh long after washing. For example, these exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~6 | ~3.5 to ~5.5 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Polymer (e.g., PQ6, A1000, PQ16 5VP-95QVI, PQ16 50VP-50QVI, PQ37, C113, or combos) | ~0.25 to ~4 | ~0.25 to ~1.5 |
| Cellulose based thickener | ~0.1 to ~0.5 | ~0.25 to ~0.45 |
| Fermentation based suspending agent (e.g., Cellulon ™ R93) | ~1 to ~4 | ~1.5 to ~2.5 |
| Opacifier and/or encapsulated fragrance, preferably having a polyacrylate or biodegradable shell (i.e., not formaldehyde-releasing shells) | ~0.05 to ~2 | ~0.07 to ~1.5 |
| Water | ~80 to ~97.5 | ~85 to ~95 |

In another example, the exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~4 | ~2.5 to ~3.5 |
| Alkylamine oxide | ~0.3 to ~1.5 | ~0.4 to ~1 |
| Phenoxyethanol | ~0.4 to ~1 | ~0.45 to ~0.75 |
| Citric acid | ~0.5 to ~1 | ~0.6 to ~0.9 |
| Polymer (e.g., PQ6, A1000, PQ16 5VP-95QVI, PQ16 50VP-50QVI, PQ37, C113, or combos) | ~1 to ~3 | ~1.5 to ~2.5 |
| Cellulose based thickener | ~0.1 to ~0.5 | ~0.25 to ~0.45 |
| Opacifier and/or encapsulated fragrance, preferably having a polyacrylate or biodegradable shell (i.e., not formaldehyde-releasing shells) | ~0.05 to ~2 | ~0.07 to ~1.5 |
| Water | ~80 to ~97.5 | ~85 to ~95 |

In this embodiment, polyquaternium 37 may act as both a germ kill booster and suspending agent for the opacifier and/or encapsulated fragrance.

Dye and additional fragrance may be added to improve the aesthetic appeal of the resulting formulation. For example, these exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~1 | ~0.45 to ~0.75 |
| Propylene glycol | ~0.25 to ~1 | ~0.3 to ~0.75 |
| Citric acid | ~0.5 to ~1 | ~0.6 to ~0.9 |
| Sodium Hydroxide | ~0.01 to ~0.05 | ~0.02 to ~0.04 |
| Polymer (e.g., PQ6, A1000, PQ16 5VP-95QVI, PQ16 50VP-50QVI, PQ37, C113, or combos) | ~0.25 to ~4 | ~0.25 to ~1.5 |
| Cellulose based thickener | ~0.1 to ~0.5 | ~0.25 to ~0.45 |
| Fermentation based suspending agent (e.g., Cellulon ™ R93) | ~1 to ~4 | ~1.5 to ~2.5 |
| Opacifier and/or encapsulated fragrance, preferably having a polyacrylate or biodegradable shell (i.e., not formaldehyde-releasing shells) | ~0.05 to ~2 | ~0.07 to ~1.5 |
| Dye | 0 to ~0.002 | ~0.0008 to ~ 0.0018 |
| Fragrance | 0 to ~2 | ~0.3 to ~1.5 |
| Water | ~80 to ~97.5 | ~85 to ~95 |

In another example, the exemplary laundry compositions comprise, consist essentially of, or consist of:

| Ingredient | % wt | Preferable % wt |
|---|---|---|
| C12-16 or C12-18 alkyl dimethyl benzyl ammonium chloride | ~2 to ~8 | ~4 to ~7 |
| Alkylamine oxide | ~0.3 to ~1.5 | ~0.4 to ~1 |
| Phenoxyethanol | ~0.4 to ~ 1 | ~0.45 to ~0.75 |
| Propylene glycol | ~0.25 to ~1 | ~0.3 to ~0.75 |
| Citric acid | ~0.5 to ~1 | ~0.6 to ~0.9 |
| Sodium Hydroxide | ~0.01 to ~0.05 | ~0.02 to ~0.04 |
| Polymer (e.g., PQ6, A1000, PQ16 5VP-95QVI, PQ16 50VP-50QVI, PQ37, C113, or combos) | ~0.25 to ~4 | ~0.25 to ~1.5 |
| Cellulose based thickener | ~0.1 to ~0.5 | ~0.25 to ~0.45 |
| Opacifier and/or encapsulated fragrance, preferably having a polyacrylate or biodegradable shell (i.e., not formaldehyde-releasing shells) | ~0.05 to ~2 | ~0.07 to ~1.5 |
| Dye | 0 to ~0.002 | ~0.0008 to ~ 0.0018 |
| Fragrance | 0 to ~2 | ~0.3 to ~1.5 |
| Water | ~80 to ~97.5 | ~85 to ~95 |

In this embodiment, polyquaternium 37 may act as both a germ kill booster and suspending agent for the opacifier and/or encapsulated fragrance.

Methods of sanitizing laundry during a laundry washing process using any of the disclosed compositions are also disclosed. The disclosed methods may further soften and or treat the fabrics being laundered. Exemplary fabrics include but are not limited to cotton, spandex, microfiber, polyester, rayon, nylon, lycra, or any combination thereof. About 25 mL to about 400 mL, preferably about 200 mL, of the disclosed compositions is added to the fabric softener compartment or directly to the rinse cycle of an automatic washing machine. The disclosed compositions are used in the last rinse cycle of the automatic washing machine process. Approximately 75 mL to approximately 180 mL is added to the fabric softener compartment or directly to the rinse cycle of a top loading washing machine that uses approximately 39 L per rinse. Approximately 125 mL to approximately 300 mL is added to the fabric softener compartment or directly to the rinse cycle of a top loading washing machine that uses approximately 47 L per rinse. Approximately 250 mL to approximately 350 mL is added to the fabric softener compartment or directly to the rinse cycle of a top loading washing machine that uses approximately 71 L per rinse. Approximately 300 mL to approximately 400 mL is added to the fabric softener compartment or directly to the rinse cycle of a top loading washing machine that uses approximately 89 L per rinse. Approximately 25 mL to approximately 100 mL is added to the fabric softener compartment of a front loading washing machine that uses approximately 17 L per rinse.

The 1:315 dilution of the disclosed compositions with water achieves at least a 3 $\log_{10}$ reduction according to the ASTM 2274 protocol, under clean conditions in no more than 30 minutes at 20° C. Preferably, the 1:315 dilution of the disclosed compositions with water achieves at least a 3 $\log_{10}$ reduction in no more than 25 minutes at 20° C. As a result of this dilution capability, consumers may use the disclosed compositions in a large variety of rinse cycles having varying amounts of rinse water and still ensure that their clean laundry harbors fewer pathogens.

Examples

The following examples illustrate exemplary formulations as well as preferred embodiments of the invention. It is to be understood that these examples are provided by way of illustration only and that further useful formulations falling within the scope of the present invention and the claims may be readily produced by one skilled in the art without deviating from the scope and spirit of the invention.

The compositions in the following examples were prepared using the ingredients identified in Table A:

TABLE A

| Abbreviation | CAS | Description |
|---|---|---|
| BKC | 68424-85-1 | C12-16 alkyldimethylbenzylammonium chloride, e.g., BTC ™ 8358 (80% in ethanol and water) sold by Stepan |
| 2080 | 68424-95-3 | Blend of dioctyldimethylammonium chloride, octyldecyldimethylammonium chloride, & didecyldimethylammonium chloride e.g. BARDAC ™ 2080 (80% pure in ethanol and water) sold by Arxada |
| 1010 | 7173-51-5 | Didecyldimethylammonium chloride e.g. BTC ™ 1010-80 (80% pure in ethanol and water) sold by Stepan |
| 9EO | 68551-12-2 | Ethoxylated C12-16 Alcohols e.g., Genapol ™ LA 090 sold by Clariant |
| WE | 157905-74-3 | Liquid N,N'-di(alkylcarboxyethyl)-N-hydroxyethyl-N-methylammonium methyl sulfate, e.g., Rewoquat ™ WE 45 (75% in ethanol) sold by Evonik |
| SLES | 68585-34-2 | Sodium lauryl ether sulfate e.g., Calfoam ™ ES-302 (27% active) sold by Pilot |
| CocoB | 61789-40-0 | Cocoamidopropyl Betaine e.g., Galaxy ™ CAPB SB (30% in water) sold by Tri-K Industries |
| APG | 110615-47-9 | Lauryl glucoside, e.g., Glucopon ™ 425n (50% in water) sold by BASF |
| LO | 1643-20-5 | Lauramine oxide, e.g., Ammonyx ™ LO (30% in water) sold by Stepan |
| MO | 3332-27-2 | Dimethyltetradecylamine Oxide, e.g., Ammonyx ™ MO (30% in water) sold by Stepan |
| DO | 2605-79-0 | Decyl amine oxide, e.g. Ammonyx ™ DO (30% in water) sold by Stepan |
| PG | 57-55-6 | Propylene glycol |
| DPG | 25265-71-8 | Dipropylene Glycol |
| DPNB | 5131-66-8 | Propylene Glycol n-butyl Ether, e.g., Dowanol ™ PnB sold by Dow |
| EGHE | 112-25-4 | Ethylene glycol mono hexyl ether, e.g., Hexyl Cellosolve ™ sold by Dow |
| HEC | 9004-62-0 | 2-Hydroxyethyl ether cellulose, e.g., Natrosol ™ 250 HHR sold by Ashland (>94% in sodium sulfate) or Cellulon RC-76 sold by CP Kelco |
| PE | 122-99-6 | Phenoxyethanol, e.g., Protectol ™ PE NA sold by BASF |
| NaOH | 1310-73-2 | Sodium Hydroxide (50% in water) |
| CA | 77-92-9 | Citric Acid Anhydrous |
| D | Various | Various Dyes |
| F | Various | Various Fragrances |
| Encap | Various | Various encapsulated fragrances dispersed in a slurry, preferably having a polyacrylate or biodegradable shell (i.e., not formaldehyde-releasing shells) |
| H2O | 7732-18-5 | Water |
| OPR2 | 61789-40-0, 627-83-8, & 532-32-1 | Cocamidopropyl betaine (7.5%) and glycol distearate (30%), e.g., Miracare ™ OPR2, previously known as Mackadet ™ OPR2, sold by Solvay |
| PQ37 | 26161-33-1 | Polyquaternium-37 (50% active), e.g., Viscaress-PC-LQ sold by Croda |

TABLE A-continued

| Abbreviation | CAS | Description |
|---|---|---|
| R93 | 9004-34-6<br>65-85-0 | Mixture of fermentation derived cellulose and benzoic acid, e.g., Cellulon ™ R93 sold by CP Kelco US Inc. |
| PQ6 | 26062-79-3 | Poly(diallyldimethylammonium chloride) e.g., poly(DADMAC) <100 kDa (35% in water) or 200-300k or 400-500k (both 20% in water), all sold by Sigma Aldrich |
| PQ7 | 26590-05-6 | Poly(acrylamide-co-diallyldimethylammonium chloride), e.g., 10% solution sold by Sigma Aldrich |
| PQ16 | 95144-24-4 | Copolymers of vinylpyrrolidone (VP) and quaternized vinylimidazole (QVI) (5VP-95QVI), e.g., Luviquat ™ Excellence (38.42% in water) sold by BASF |
| PQ16 | 95144-24-4 | Copolymers of VP and QVI (50VP-50QVI), e.g., Luviquat ™ FC550 (38% in water) sold by BASF |
| PQ16 | 95144-24-4 | Copolymers of VP and QVI (70VP-30VPI), e.g., Luviquat ™ (38% in water) sold by BASF |
| A1000 | 26427-01-0 | 1-propanaminium, N,N,N-trimethyl-3-[(1-oxo-2-propenyl)amino] chloride, homopolymer, e.g., N-Durhance ™ A1000 (15-25% in water) sold by Ashland |
| PQ28 | 131954-48-8 | 2-pyrrolidinone, 1-ethenyl-, polymer with N,N,N-trimethyl-3-[(2-methyl-1-oxo-2-propenyl)amino]-1-propanaminium chloride, e.g., Gafquat ™ HS-100 (15-25% in water) sold by Ashland |
| C113 | 26427-33-1 | 1-dodecanaminium, N,N-dimethyl-N-[3-[(2-methyl-1-oxo-2-propen-1-yl)amino]propyl]-, chloride (1:1), polymer with sodium 2-methyl-2-[(1-oxo-2-propen-1-yl)amino]-1-propanesulfonate (1:1) and N,N,N-trimethyl-3-[(1-oxo-2-propen-1-yl)amino]-L propanaminium chloride (1:1), e.g., Chromohance ™ 113 (15-25% in water) sold by Ashland |

Example 1

Exemplary laundry sanitizer and fabric conditioning formulations are provided in Table 1:

TABLE 1

| Abbreviation | E1 | E2 |
|---|---|---|
| BKC (80%) | 7.28 (5.82) | 7.28 (5.82) |
| LO (30%) | 1.50 (0.45) | 1.50 (0.45) |
| PE | 0.50 | 0.50 |
| WE (75%) | 4.50 (3.38) | 4.50 (3.38) |
| PG | 0.50 | 0.50 |
| HEC | 0.30 | 0.30 |
| NaOH (50%) | 0.05 (0.025) | 0.05 (0.025) |
| CA | 0.85 | 0.85 |
| D | 0.0018 | 0.0018 |
| F | Up to 3 | Up to 3 |
| H2O | 81.5182 | 80.0182 |
| OPR2 | 0.25 | 0.25 |
| PQ37 | 1.00 (0.5) | 0 |
| Encap Slurry | 0 | 0.5 |
| R93 | 0 | 2.00 |

E1 was prepared by adding H2O to a tank with a mixer. The mixer was started. LO was added and mixed until homogeneous. PG was added and mixed until homogeneous. HEC was added and mixed until homogenous. The mixture became hazy/opaque after addition of HEC. The package containing the BKC raw material was mixed/shaken to ensure uniformity. The recently mixed/shaken BKC raw material is then added to the tank and mixed until homogeneous. The package containing the WE raw material was mixed/shaken to ensure uniformity. The recently mixed/shaken WE raw material is then added to the tank and mixed until homogeneous. PE was added and mixed until homogenous. NaOH was added and mixed until homogenous. The mixing for this step takes a little longer than prior mixing steps. The viscosity of the mixture increases significantly to approximately 200 cPs as measured after 60 seconds at 100 RPM using a LV62 spindle at ambient temperature. The hazy/opaque mixture also transforms to clear. Failure to provide sufficient NaOH mixing time may impact product stability. CA was added and mixed until homogeneous. The package containing the OPR2 raw material was mixed/shaken to ensure uniformity. The recently mixed/shaken OPR2 raw material was added and mixed until homogeneous. The formulation turned opaque. PQ37 was added and mixed until homogeneous. F and D were added and mixed until homogeneous. The final formulation was a light blue opaque liquid with a subtle shimmer effect when in motion.

E2 was prepared by adding H2O to a tank with a mixer. The mixer was started. LO was added and mixed until homogeneous. PG was added and mixed until homogeneous. The package containing the OPR2 raw material was mixed/shaken to ensure uniformity. The recently mixed/shaken OPR2 raw material was added and mixed until homogeneous. HEC was added and mixed until homogenous. The mixture became hazy/opaque after addition of HEC. NaOH was added and mixed until homogenous. The mixing for this step takes a little longer than prior mixing steps. The viscosity of the mixture increases significantly to approximately 200 cPs as measured after 60 seconds at 100 RPM using a LV62 spindle at ambient temperature. The hazy/opaque mixture also transforms to clear. Failure to provide sufficient NaOH mixing time may impact product stability. CA was added and mixed until homogeneous. The Encap is shaken to ensure uniformity & then is added and mixed until homogeneous. Add R93 and mix until homogeneous. The package containing the BKC raw material was mixed/shaken to ensure uniformity. The recently mixed/shaken BKC raw material is then added to the tank and mixed until homogeneous. The package containing the WE raw material was mixed/shaken to ensure uniformity. The recently mixed/shaken WE raw material is then added to the tank and mixed until homogeneous. PE was added and mixed until homogenous. F and D were added and mixed until homogeneous. The final formulation was a light blue opaque liquid with a subtle shimmer effect when in motion.

No heating is needed for either process, providing for a more cost effective and safe manufacturing process.

After completing the batch, samples will need to be analyzed for:

Color, Odor, Appearance
pH
Specific Gravity
Viscosity
Active Content-Benzalkonium Chloride (analyzed via HPLC)

Example 2

Stability Tests

E1 was tested for stability alongside a competitor's fabric softener. According to the company's publicly available website, the commercial product contains diethylester dimethyl ammonium chloride, polyquaternium-33 (PQ33), formic acid, a blend of polyoxyalkylene substituted chromophores, pentasodium pentetate, fragrance, and water. The stability was quantified by observing color, odor, appearance, viscosity, & pH at key conditions (54° C. for 2 weeks, −10° C.-3 freeze thaw cycles). The results are provided in Table 2:

TABLE 2

| | | Laundry Sanitizer | | Fabric Softener Competitor | |
|---|---|---|---|---|---|
| Parameter | Success Criteria | 2 wks 54 C. | −10 (F + T)* | 2 wks 54 C. | −10 (F + T)* |
| color | No Change | Pass | Pass | Pass | Pass |
| odor | Only Slight Drops | Pass | Pass | Pass | Pass |
| appearance | No Change | Pass | Pass | Fail (Chunky) | Fail (Chunky) |
| viscosity | Must be pourable | Pass | Pass | Fail (Chunky) | Fail (Chunky) |
| pH | <0.5 pH unit deviation | Pass | Pass | Pass | Pass |

*F&T = Freeze/Thaw = 6 days only: 3 cycles of 24 each at −10° C. and 25° C.

These results demonstrate the improved stability of E1 as compared to a commercially available fabric conditioner emulsion system. Based on the chemical structure of PQ33, Applicant believes that PQ33 in the competitor's fabric softener would exhibit less antimicrobial synergy with the benzyl-substituted quaternary ammonium compound than PQ37 contained in formulation E1.

Example 3-Antimicrobial Activity

The antimicrobial efficacy of the formulations in Table 3 was determined using ASTM E2274-16 entitled the Standard Test Method for Evaluation of Laundry Sanitizers and Disinfectants (version 15 Apr. 2016). A greater than 3 $\log_{10}$ reduction of all organisms (*Klebsiella pneumoniae, Staphylococcus aureus*) on both the test fabric swatch & simulated wash water for a contact time of 1 to 60 minutes (determined by product specification) at a testing temperature ranging from 4° C. to 60° C.±1.0° C. (determined by product specification) is required to pass the ASTM E2274-16 for a sanitization product. For a disinfecting product, total kill must be achieved. Additional and optional contact times, temperatures, and test organisms may be used.

Microorganisms were subcultured on Nutrient Agar A (through at least one daily transfer), incubating at 35±2° C. On the day prior to testing, the slant was washed and cells transferred into French square bottles containing 20 mL of solidified Nutrient Agar B. The cells were then incubated between 18 to 24 hours at 35±2° C., agar side down. Growth was then removed using 3-mL dilution fluid and 5 sterile glass beads to suspend the growth. Cultures were then standardized to yield approximately $10^8$ CFUs per mL of *S. aureus* and $10^9$ CFUs of *K. pneumoniae.*

The tests were performed using "clean" experimental conditions, which means no organic soil load was included for this test method. For laundry sanitizers/softeners, the desired experimental conditions are "clean conditions" because the laundry sanitizer/softener is used after a laundry detergent in a laundry washing process, i.e. on clean laundry.

As the test is designed to simulate killing bacteria on fabric, the test fabric also needs to be prepared. 300 g of test fabric was boiled for 1 hour in 3 L of deionized water containing 1.5 g $NaCO_3$ and 1.5 g nonionic wetting agent. The fabric was then rinsed in boiling water, then in cold water, until there was no longer the appearance of foam. The fabric was then air dried for 24 hours at room temperature. Once dry, the fabric was cut into 2 inch strips, weighing 15±0.1 grams each. The fabric was then secured onto a stainless steel spindle & wrapped precisely 12 times & then secured (as to represent laundry ballast). Furthermore, 1 by 1.5 inch fabric swatches were cut from the remaining fabric & used as carriers for microorganisms. At least 3 carriers were prepared for each organism tested. On the day of testing, these carriers were inoculated with 0.030 mL of prepared inoculum, taking care to distribute evenly across the 1 by 1.5 inch swatches. Swatches were dried in a 35±2° C. incubator for no longer than 30 minutes, and were used within 1 hour of drying. When ready, they were to be placed between the 6th and 7th folds of the simulated ballast, without any overlap of the swatches.

Experimentally, a 1:315 dilution of test substance was prepared in hard water (400 ppm $CaCO_3$) within 3 hours of testing. Approximately 150 mL of this test substance (simulated rinse water) was used to submerge the fabric carrier & ballast in a sterile exposure chamber that is agitated for the desired contact time. The test was allowed to proceed for 25 minutes and then the simulated rinse water and fabric carriers were separately neutralized. The carriers were then plated, and both plates/tubes are incubated for 48±2 hours at 35±2° C. The results were evaluated for sanitization (in terms of $\log_{10}$ reduction) or for disinfection (positive or negative result for growth). The results are provided in Table 3:

TABLE 3

| Abbr | C1 | C2 | C3 | C4 | E3 | E4 | E5 | E6 | E7 |
|---|---|---|---|---|---|---|---|---|---|
| 2080 (80%) | 0 | 4.4 (3.52) | 6.9 (5.52) | 4.12 (3.23) | 0 | 0 | 0 | 0 | 0 |
| 1010 (80%) | 4.4 (3.52) | 0 | 0 | 0 | 0 | 0 | 0 | 0 | 0 |
| BKC (80%) | 0 | 2.9 (2.32) | 0 | 2.75 (2.2) | 6.9 (5.52) | 6.6 (5.28) | 6.67 (5.34) | 6.67 (5.34) | 6.67 (5.34) |
| LO (30%) | 1.50 (0.45) | 1.50 (0.45) | 1.5 (0.45) | 1.5 (0.45) | 1.5 (0.45) | 1.5 (0.45) | 1.5 (0.45) | 1.5 (0.45) | 1.5 (0.45) |
| PE | 0.5 | 0.5 | 0.5 | 0.5 | 0.5 | 0.5 | 0.5 | 0.5 | 0.5 |
| WE (75%) | 2 (1.5) | 4 (3) | 4 (3) | 4.5 (3.38) | 4.5 (3.38) | 4.5 (3.38) | 4.5 (3.38) | 4.5 (3.38) | 4.5 (3.38) |
| PG | 0 | 0 | 0 | 0.5 | 0.5 | 0.5 | 0.5 | 0.5 | 0.5 |
| HEC | 0.3 | 0.35 | 0.35 | 0.35 | 0.35 | 0.35 | 0.35 | 0.35 | 0.35 |
| NaOH (50%) | 0.045 (0.02) | 0.05 (0.02) | 0.05 (0.02) | 0.05 (0.02) | 0.05 (0.02) | 0.05 (0.02) | 0.05 (0.02) | 0.05 (0.02) | 0.05 (0.02) |
| CA | 0.85 | 3 | 3 | 0.85 | 0.85 | 0.85 | 0.85 | 0.85 | 0.85 |
| OPR2 | 0 | 0 | 0 | 0.25 | 0.25 | 0.25 | 0.25 | 0.25 | 0.25 |
| PQ37 | 0 | 0 | 0 | 0 | 0 | 0.5 (0.25) | 1 (0.5) | 1 (0.5) | 0 |
| R93 | 0 | 0 | 0 | 0 | 0 | 0 | 0 | 0 | 2 |
| Encap | 0 | 0 | 0 | 0 | 0 | 0 | 0 | 0 | 0.5 |
| F | 0 | 0 | 0 | 0 | 0 | 0 | 0 | 0.8 | 0.9 |
| D | 0 | 0 | 0 | 0 | 0 | 0.0018 | 0.0018 | 0.0018 | 0.0018 |
| H2O | q.s. | q.s. | q.s. | q.s. | q.s. | q.s. | q.s. | q.s. | q.s. |
| Swatch Result | 0.42 | Total Kill | 2.1 | 4.19 | Total Kill | Total Kill | 3.35 | Total Kill | 4.32 |
| Wash Water Result | 3.97 | Total Kill | Total Kill | Total Kill | Total Kill | Total Kill | Total Kill | Total Kill | Total Kill |

These results demonstrate that BKC is more efficacious than Dialkyl Dimethyl Ammonium Chlorides (DDAC or 2080 and 1010) alone (at an equivalent level). The results also suggest that BKC alone is performing better (or at least the same as) a blend of BKC and DDAC. Finally, these results demonstrate that the concentration of BKC can be lowered by addition of PQ37 (E2 and E4) and still obtain germ kill equivalent to that obtained from a higher concentration of BKC (E1).

For context, it is typically observed in the ASTM 2274 method that meeting success criteria on the swatch is more challenging than in the wash water. This is likely due to mobility of the active agents and their ability to penetrate deep into the simulated ballast to reach the inoculated fabric carriers. Inversely, the simulated rinse water is similar to a solution, where there is little interference between the active substance and any particles suspended therein.

Example 4-Micro Efficacy Synergy-Phenoxyethanol with BKC

The antimicrobial efficacy of the formulations in Table 4 was determined using ASTM E2274-16 entitled the Standard Test Method for Evaluation of Laundry Sanitizers and Disinfectants (version 15 Apr. 2016), as described in Example 3.

TABLE 4

| Formula | C5 | E8 | E9 |
|---|---|---|---|
| BKC (80%) | 7.25 (5.8) | 7.25 (5.8) | 6.875 (5.5) |
| DO (30%) | 1.50 (0.45) | 1.50 (0.45) | 1.50 (0.45) |
| PE | 0 | 0.5 | 0.9 |
| PG | 0.5 | 0.5 | 0.5 |
| PQ6 | 1.0 (0.4) | 1.0 (0.4) | 1.0 (0.4) |
| EGHE | 1.0 | 1.0 | 1.0 |
| NaOH (50%) | 0.05 (0.02) | 0.05 (0.025) | 0.05 (0.025) |
| CA | 0.85 | 0.85 | 0.85 |

TABLE 4-continued

| Formula | C5 | E8 | E9 |
|---|---|---|---|
| H2O | q.s. | q.s. | q.s. |
| Swatch Result | 3.03 | 4.46 | 3.66 |
| Wash Water Result | Total Kill | Total Kill | Total Kill |

The results in Table 4 demonstrate that increasing phenoxyethanol improves the micro efficacy of quat-based formulas in swatch results. Formula C5 did not contain phenoxyethanol while E8 and E9 contained increasing amounts of phenoxyethanol. Formula E9 showed a decrease in efficacy in swatch results because the BKC level was reduced, but it still shows an improvement over C5.

Example 5-Micro Efficacy Synergies-Amphoteric Surfactants with BKC

The antimicrobial efficacy of the raw materials in Table 5 were screened using F.A.S.T. (Fast Antimicrobial Screening Technology) against *Staphylococcus aureus* and *Pseudomonas aeruginosa*. F.A.S.T. is a modified test method based on EN1276. It is a quicker test method that runs many test products simultaneously per plate and can be used for feasibility studies. For the purposes of our test methods, the turbidity method was utilized. A 96 well plate was set up and neutralizer media was pipetted into column 2 of the plate. Growth media was pipetted into columns 3-12. A control of either AOAC or EN lab purified sterile water was added to column 1 in at least duplicates. Test products were added to open rows in column 1 in at least duplicates. Up to 4 products, including the control, can be tested on a single plate. Bacterial suspension was mixed with certain conditions depending on product usage. To mimic the laundry rinse cycle, solutions were kept around 20C and 0.3 g/L bovine albumin was added to the bacterial suspension. After 2 minutes, the bacteria solution was transferred into wells in column 1 using a multi-channel pipet. The solutions in each well were mixed by pipetting up and down. After the designated contact time has expired, column 1 solutions were transferred into the wells with neutralizer and pipet to mix. A contact time of 25 minutes was used to mimic the laundry rinse cycle. The neutralized solution was then transferred in column 3 with growth media and mixed. Solutions in column 3 were then serially diluted 1:10 into the remaining wells with growth media. The plate was covered and added to an incubator overnight. Wells that show turbidity were used to estimate bacteria $\log_{10}$ reduction. The Spearman-Karber method (Eq. 1) was used to calculate the $\log_{10}$ recovery.

$$\text{Log}_{10}\text{ recovery} = \text{Highest dilution }(HD)\text{ with both positives} - 0.5 + (\text{sum of positive wells at }HD\text{ and up})/2. \quad \text{(Eq. 1)}$$

TABLE 5

| Formula | C6 | C7 | C8 | C9 | C10 |
|---|---|---|---|---|---|
| 9EO | 6.58 (6.25) | 0 | 0 | 0 | 0 |
| SLES | 0 | 23.58 (6.25) | 0 | 0 | 0 |
| CocoB | 0 | 0 | 6.58 (6.25) | 0 | 0 |
| APG | 0 | 0 | 0 | 12.39 (6.25) | 0 |
| LO (30%) | 0 | 0 | 0 | 0 | 21.26 (6.25) |
| H2O | q.s. | q.s. | q.s. | q.s. | q.s. |
| *Staphylococcus aureus* $\log_{10}$ reduction | 0 | 0 | 0 | 0 | 2 |
| *Pseudomonas aeruginosa* $\log_{10}$ reduction | 0 | 0 | 0 | 0 | 0 |

Table 5 demonstrates that most surfactants do not contribute to micro efficacy, but some amphoteric surfactants such as Lauramine Oxides can contribute to reducing bacteria levels. The samples targeted 6.25% wt in solution and were further diluted during testing to a final active level of about 5%. Only the sample with Lauramine Oxide showed a $\log_{10}$ reduction against *Staphylococcus aureus*. Findings from this study were utilized in full laundry sanitizer formulas.

The antimicrobial efficacy of formulas in Table 6 utilized ASTM E2274-16 entitled the Standard Test Method for Evaluation of Laundry Sanitizers and Disinfectants (version 15 Apr. 2016), as described in Example 3.

TABLE 6

| Formula | E10 | E11 | E12 | E13 | E14 |
|---|---|---|---|---|---|
| BKC (80%) | 7.25 (5.8) | 7.25 (5.8) | 7.25 (5.8) | 6.875 (5.5) | 6.875 (5.5) |
| LO (30%) | 1.5 (0.45) | | | | |
| DO (30%) | | 1.5 (0.45) | | 1.5 (0.45) | 2.0 (0.6) |
| MO (30%) | | | 1.5 (0.45) | | |
| PE | 0.5 | 0.5 | 0.5 | 0.5 | 0.5 |
| PG | 0.5 | 0.5 | 0.5 | 0.5 | 0.5 |
| PQ6 | | | | 1.0 (0.4) | 1.0 (0.4) |
| EGHE | 2.0 | 2.0 | 2.0 | 1.0 | 1.0 |
| NaOH (50%) | 0.05 (0.02) | 0.05 (0.025) | 0.05 (0.025) | 0.05 (0.025) | 0.05 (0.025) |
| CA | 0.85 | 0.85 | 0.85 | 0.85 | 0.85 |
| H2O | q.s. | q.s. | q.s. | q.s. | q.s. |
| Swatch Result | 2.54 | 3.34 | 3.29 | 1.81 | 4.16 |
| Wash Water Result | Total Kill | Total Kill | Total Kill | 1.48 | Total Kill |

Table 6 demonstrates how amphoteric surfactants improve the micro efficacy of quat-based formulas. Formulas E10, E11, and E12 contained LO, DO, or MO, respectively, and demonstrated some micro efficacy against Kp, with MO and DO achieving passing results of >3 $\log_{10}$. Formulas E13 and E14 both reduced the quat to 5.5%, but Formula E14 increased the DO surfactant level to 0.6%, resulting in a significant increase of efficacy.

Example 6-Micro Efficacy Synergies-Solvents

The antimicrobial efficacy of the formulations in Table 7 was determined using ASTM E2274-16 entitled the Standard Test Method for Evaluation of Laundry Sanitizers and Disinfectants (version 15 Apr. 2016), as described in Example 3.

TABLE 7

| Formula | E15 | E16 | E17 | E18 | E19 |
|---|---|---|---|---|---|
| BKC (80%) | 7.8125 (6.25) | 7.8125 (6.25) | 7.25 (5.8) | 6.625 (5.3) | 6.625 (5.3) |
| LO (30%) | 1.50 (0.45) | 1.50 (0.45) | | | |
| DO (30%) | | | 1.5 (0.45) | 2 (0.6) | 2 (0.6) |
| PE | 0.5 | 0.5 | 0.5 | 0.9 | 0.9 |
| PG | 0.5 | 0.5 | 0.5 | 0.5 | 0.5 |
| PQ6 | | | 1.0 (0.4) | 1.0 (0.4) | 1.0 (0.4) |
| DPNB | 2.0 | | | | |
| EGHE | | 2.0 | 1.0 | 1.0 | |
| DPG | | | | | 1.0 |
| NaOH (50%) | 0.05 (0.02) | 0.05 (0.02) | 0.05 (0.025) | 0.05 (0.025) | 0.05 (0.025) |
| CA | 0.85 | 0.85 | 0.85 | 0.85 | 0.85 |
| H2O | q.s. | q.s. | q.s. | q.s. | q.s. |
| Swatch Result | 2.28 | Total Kill | 4.46 | 4.25 | 2.73 |
| Wash Water Result | Total Kill | Total Kill | Total Kill | Total Kill | Total Kill |

Table 7 demonstrates that certain solvents boost micro efficacy. Formula E15 showed failing results against Kp, but when substituting the solvent with EGHE in Formula E16, the micro result improved significantly. Formula E17 and E18 utilized all micro efficacy synergies reported in this application to show that a combination of the EGHE solvent with PQ6 and DO allows us to further reduce the quat levels. Formula E18 and E19 compare the ethylene glycol monohexyl ether solvent against DPG, respectively, and show a decrease in micro efficacy.

Example 7-Softness

Formulation E1 from Example 1 above was tested against existing laundry products, including two laundry softeners, a laundry detergent and a laundry sanitizer. The publicly available ingredients for the existing products is provided in Table 8 below. The test was performed utilizing a modified version of ASTM D5237-14 "Standard Guide for Evaluating Fabric Softeners (modified)".

TABLE 8

| Sample | Description |
|---|---|
| A | commercially available fabric softener containing: diethylester dimethyl ammonium chloride, polyquaternium-33, formic acid, blend of polyoxyalkylene substituted chromophores, and pentasodium pentetate, and fragrance (same as Example 2) |
| B | commercially available laundry detergent containing: C12-15 alcohols ethoxylated; sodium laureth sulfate; sodium carbonate, alcohol, tetrasodium iminodisuccinate, sodium cocoate, sodium polyacrylate, fluorescent brightener 5, benzisothiazolinone |
| C | commercially available laundry sanitizer containing: Octyl decyl dimethyl ammonium chloride, dodecyl dimethyl ammonium chloride, dioctyl dimethyl ammonium chloride, C14-16 alkyl dimethyl ammonium chloride, water, C10-16 pareth, fragrance, sodium bicarbonate, sodium carbonate, colorant |
| D | commercially available fabric softener containing: water, citric acid, propylene glycol, sodium formate, C12-16 pareth-9, sodium cumenesulfonate, fragrance |

Method

A fabric bundle consisting of 100% cotton towels were washed with laundry detergent and then treated with the test product during the machine's rinse cycle. All samples were washed with 6 lbs of 100% cotton ballast. After wash/rinse completion, towels were dried on a "permanent press" machine setting. Once complete, they were allowed to equilibrate to ambient temperature & humidity. All products were tested considering their dosage recommendation for a "medium" load of laundry.

20 individual panelists evaluated the blinded samples in a randomized order. Prior to evaluations, each panelist was instructed to wash and dry hands. If re-evaluations were needed, panelists were instructed to evaluate different sections of the towel. Panelists were presented with a group of five test fabrics on a table, with each fabric presented randomly and containing a different treatment and a blinded negative control. Each of the substrates were then assigned a softness rating on a scale of 1 to 5, with 5 being extremely soft, and 1 being extremely rough. The evaluations were all completed within the span of 2 hours. After evaluating the substrates, panelists were also instructed to evaluate the liking of this softness more holistically as to minimize any introduced bias (as it is known that imparting softness can sometimes deliver unintended consequences . . . e.g. a greasy or slick feeling, reduced absorbency, etc.) All data and results can be found below in Tables 9 and 10.

TABLE 9

| Softness Rating Results | | | | | |
|---|---|---|---|---|---|
| Subject | A | B | C | D | E |
| 1 | 1 | 2 | 3 | 4 | 5 |
| 2 | 2 | 2 | 3 | 2 | 4 |
| 3 | 3 | 2 | 3 | 2 | 4 |
| 4 | 4 | 3 | 4 | 3 | 3 |
| 5 | 4 | 4 | 4 | 4 | 4 |
| 6 | 3.5 | 2 | 3 | 3.5 | 3.5 |
| 7 | 2 | 2 | 2 | 2 | 2 |

TABLE 9-continued

| Softness Rating Results | | | | | |
|---|---|---|---|---|---|
| Subject | A | B | C | D | E |
| 8 | 2 | 3 | 4 | 3 | 5 |
| 9 | 3 | 3 | 4 | 2 | 5 |
| 10 | 4 | 1 | 3 | 1 | 5 |
| 11 | 3 | 2 | 2 | 2 | 3 |
| 12 | 3 | 1 | 3 | 3 | 5 |
| 13 | 2 | 1 | 4 | 3 | 5 |
| 14 | 4 | 3 | 3 | 3 | 5 |
| 15 | 3 | 2 | 4 | 3 | 5 |
| 16 | 5 | 1 | 2 | 3 | 5 |
| 17 | 4 | 1 | 3 | 3 | 5 |
| 18 | 3 | 2.5 | 3 | 2.5 | 4 |
| 19 | 3 | 2 | 3 | 2 | 3 |
| 20 | 3 | 1 | 3 | 4 | 5 |
| Average | 3.075 | 2.0 | 3.2 | 2.8 | 4.3 |

TABLE 10

| Softness Liking Results | | | | | |
|---|---|---|---|---|---|
| Subject | A | B | C | D | E |
| 1 | 1 | 1 | 2 | 4 | 5 |
| 2 | 1 | 1 | 3 | 1 | 5 |
| 3 | 3 | 2 | 3 | 2 | 4 |
| 4 | 5 | 4 | 5 | 4 | 4 |
| 5 | 4 | 4 | 4 | 4 | 4 |
| 6 | 4 | 2 | 3.5 | 4 | 4 |
| 7 | 2 | 2 | 2 | 2 | 2 |
| 8 | 1 | 2 | 4 | 3 | 5 |
| 9 | 3 | 3 | 3 | 3 | 5 |
| 10 | 4 | 1 | 3 | 1 | 5 |
| 11 | 4 | 3 | 3 | 3 | 4 |
| 12 | 4 | 1 | 3 | 4 | 5 |
| 13 | 2 | 1 | 4 | 3 | 5 |
| 14 | 4 | 4 | 4 | 4 | 5 |
| 15 | 2 | 1 | 5 | 2 | 5 |
| 16 | 4 | 1 | 3 | 2 | 5 |
| 17 | 4 | 1 | 3 | 1 | 5 |
| 18 | 2 | 2 | 3 | 2 | 4 |
| 19 | 3 | 2 | 3 | 2 | 3 |
| 20 | 5 | 1 | 4 | 4 | 5 |
| Average | 3.1 | 2.0 | 3.4 | 2.8 | 4.5 |

Results

At a 95% confidence interval, it was shown that the test product E1 delivered significantly higher ratings versus all other products in terms of both softness & liking of the softness. Softness is the tactile perception of softness, so the fabric may be either soft or rough. Liking of softness measures consumers expectations, meaning sometimes softness may include a greasy feeling which consumers may not like. Therefore a consumer may rate something as soft, but still not like it because they also perceive a greasy feeling. A higher “perception of softness” score is important for consumers to feel like their clothes are clean and fresh.

Example 8-BKC PQ Antimicrobial Synergy

Inoculum Preparation:

Take well-defined and typical colonies of *Staphylococcus epidermidis* from a recent plate of tryptic soy agar (TSA), dissolve and vortex them in a tube containing 30 mL of tryptic soy broth (TSB) and incubate for 17+/−1h at 37° C.+/−1° C. Quantify by plate count in TSA (incubated for 48h+/−1h at 37° C.+/−1° C.). Use the broth culture suspension within seven (7) days after the incubation period. Vortex and take 0.2 mL from the broth culture and dilute in appropriate volume of 0.85% NaCl to normalize the strain at 3-5×10^5 CFU/mL Test Sample Gradient Creation:

Using a micropipette, add 100 μL of TSB in a 96-well microtiter plate format.

Dispense 100 μL of the test sample (polymer) in column 1 (from row A to row H depending on the number of test samples) and 100 μL of the same test sample (polymer) in column 2 in their respective rows within 30 minutes of preparing the solution if it has been previously diluted. (both samples are the same)

Using a micropipette take 100 μL of the sample from column 2 and dilute it in column 3 performing a 1:1 dilution with the diluent already present in the wells, proceeding with a serial dilution up to column 9. Discard the remaining 100 μL.

Inoculum:

Within 30 minutes of preparing the gradient and inoculum bacterial suspension, dispense 20 μL of a solution of BKC in the wells from columns 2 to 9. Dispense 100 μL of inoculum using a micropipette into each well in columns 2 to 10. Columns 1 and 11 are the sample sterility test and negative test control columns, respectively. No growth should be observed in these columns. Column 10 is the positive test control and growth should be observed.

To test the polymers antimicrobial activity alone (without BKC) repeat the steps above, without the addition of the 20 μL solution of BKC.

The inoculum must be between 2.5-4.5×10^5 CFU/mL in each well.

Incubate the microwell plate for 24h+/−1h at 37° C.+/−1° C.

The minimum inhibitory concentration (MIC) is determined by visually checking the wells for growth. The MIC is defined as the minimal concentration of polymer in the corresponding well without visible growth after 24 hours of incubation. The tests were performed two times for most of the listed polyquaternium polymers. The MIC of BKC alone ranged from 5-8 ppm or 0.3-0.8 ppm in R&D test conditions. One of ordinary skill in the art will recognize that micro testing is not an exact science and results may vary significantly, especially in R&D test conditions. However, these results demonstrate the consistent synergy or lack of synergy between BKC and the polymers. The results are provided in Table 11:

TABLE 11

| | BKC MIC in ppm alone | BKC MIC in ppm with polymer | Polymer MIC in ppm with BKC | Polymer MIC in ppm alone |
|---|---|---|---|---|
| PQ6 <100 | 5-8 | 4 | 0.8 | 6.25-40 |
| kDa | 0.3-0.8 | 0.075 | 2 | 7.8 |
| PQ6 200-300 | 5-8 | 4 | 0.8 | 6.25-40 |
| kDa | 0.3-0.8 | 0.075 | 2 | 7.8 |
| PQ6 400-500 | 5-8 | 4 | 0.8 | 6.25-40 |

TABLE 11-continued

| | BKC MIC in ppm alone | BKC MIC in ppm with polymer | Polymer MIC in ppm with BKC | Polymer MIC in ppm alone |
|---|---|---|---|---|
| kDa | 0.3-0.8 | 0.075 | 3.9 | 15.6 |
| PQ7 | 5-8 | 4 | 39 | 1250 |
| | 0.3-0.8 | 0.075 | 250 | >250 |
| PQ16 | 5-8 | 4 | 0.8 | 8-12.5 |
| 5VP-95QVI | 0.3-0.8 | 0.075 | 3.9 | 15.6 |
| PQ16 | 5-8 | 4 | 0.8 | 25-47 |
| 50VP-50QVI | 0.3-0.8 | 0.075 | 15.6 | 62.5 |
| PQ16 | 5-8 | 4 | 39 | 1250 |
| 70VP-30QVI | 0.3-0.8 | 0.075 | >250 | >250 |
| A1000 | 5-8 | 4 | 0.8 | 12-16 |
| | 0.3-0.8 | 0.075 | 3.9 | 23.4 |
| PQ28 | 5-8 | 4 | 0.8 | >2500 |
| | 0.3-0.8 | 0.075 | >250 | >250 |
| C113 | 5-8 | 4 | 0.8 | 12.5-16 |
| | 0.3-0.8 | 0.075 | 3.9 | 31.2 |
| PQ37 | 5-8 | 4 | N/A | 31 |
| | 0.3-0.8 | 0.075 | 15.6 | 31.2 |

* All ppm show 100% wt concentration of active, not % wt raw material
** N/A = not analyzed As shown in Table 11 above, all 3 kDa of PQ6, PQ16 5VP-95QVI, A1000, and C113 exhibit excellent synergy with BKC, especially PQ6<100 kDa and PQ6 200-300 kDa. The combinations permit the disclosed disinfecting concentrations to significantly reduce the quantity of BKC without adding a large quantity of the polymer to the disinfecting compositions.

PQ16 50VP-50QVI and PQ37 also demonstrate synergy, but require a larger quantity of polymer to do so.

PQ7, PQ16 70VP-30VPI and PQ28 require a large quantity of polymer to increase the efficacy of BKC. And BKC is inexpensive. As a result, these polyquaternium polymers may be undesirable to use to increase the germ kill of benzyl-substituted quaternary ammonium compounds, especially if they are toxic to aquatic environment.

Example 9-Micro Efficacy Synergies-PQ6

The antimicrobial efficacy of the formulations in Table 12 was determined using ASTM E2274-16 entitled the Standard Test Method for Evaluation of Laundry Sanitizers and Disinfectants (version 15 Apr. 2016), as described in Example 3.

TABLE 12

| Formula | E20 | E21 | E22 |
|---|---|---|---|
| BKC (80%) | 8.125 (6.5) | 7.25 (5.8%) | 7.8125 (6.25) |
| LO (30%) | 1.50 (0.45) | 1.50 (0.45) | 1.50 (0.45) |
| DO (30%) | | | |
| PE | 0.5 | 0.5 | 0.5 |
| PG | 0.5 | 0.5 | 0.5 |
| PQ6 | | 1.0 (0.4) | 1.0 (0.4) |
| DPNB | | | |
| EGHE | | | |
| DPG | | | |
| NaOH (50%) | 0.05 (0.02) | 0.05 (0.02) | 0.05 (0.02) |
| CA | 0.85 | 0.85 | 0.85 |
| H2O | q.s. | q.s. | q.s. |
| Swatch Result | 2.67 | 2.38 | Total Kill |
| Wash Water Result | Total Kill | Total Kill | Total Kill |

Table 12 demonstrates that adding PQ6 boosts the micro efficacy of the formula. By adding 0.4% active amount of PQ6 to Formula E21, we were able to reduce the quat by 0.7% and to achieve a similar micro result. Formula E22 also shows a significant improvement in micro efficacy as we reduced the quat by 0.25% and added 0.4% PQ6 compared to Formula E20. Because many quats used for germ kill can add corrosivity or environmental hazards to a product, finding synergies such as PQ6 can lead to better optimized formulations.

Example 10-Moisture Wicking

The ability of fabrics to absorb moisture was evaluated by pipetting 5 water droplets onto pre-treated fabrics & noting the amount of time it takes to absorb the droplets into the fabric-full absorption being considered as the moment there is no longer a visible “dome” shape from the water resting on top of the fabrics.

Fabrics were treated by performing 5 washes in a Whirlpool top-load washing machine (separate machines for each test product & control). The machine was set to medium agitation, warm water, normal wash cycle, no pre-treatment, and 1 rinse+fabric softener settings. In each machine, 6 lbs of ballast (typically including cotton towels & t-shirts) were used in combination with polyester/spandex blend womens leggings. To perform a wash, 45 mL of dye & scent-free detergent was added directly to the washing machine drum, then the ballast & leggings were added on top. The machine was then started & allowed to proceed through the wash cycle. Once the machine entered the rinse cycle, 150 mL of the E1 from Example 1, 150 mL of E2 from Example 1, or 90 ml of Sample A from Example was added at this stage. After adding the products, the machine was allowed complete the remainder of the laundry cycle. The leggings & ballast were then dried in a Samsung dryer on the “permanent press” setting with sense dry. After drying, the entire process was repeated a total of 4 more times to complete 5 total washes.

Success on this test was achieved by needing <5 seconds for the water droplets to be absorbed onto the test fabric (validated by a control sample that was treated only with detergent and no test product). When comparing the laundry sanitizer invention to a traditional fabric conditioner and a control, it could be seen that the laundry sanitizer & control pairs of leggings were able to meet the success criteria, indicating that they did not impede the moisture absorption ability of the fabric. The leggings treated with traditional fabric conditioner, however, did require >5 seconds for the water droplets to be absorbed, indicating that the moisture absorption ability of the leggings was impaired.

The foregoing description of various aspects of the invention has been presented for purposes of illustration and description. Embodiments and/or features therein may be freely combined with one another. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A laundry sanitizing or softening composition consisting of 4.5% wt to approximately 8% wt of a benzyl-substituted quaternary ammonium compound, approximately 0.3% wt to approximately 1.5% wt of an alkylamine oxide, approximately 0.4% wt to approximately 1% wt of phenoxyethanol, and balance is water, and optionally:
   - approximately 0.5% wt to approximately 1% wt citric acid,
   - approximately 0.01% wt to approximately 0.05% wt sodium hydroxide,
   - approximately 2% wt to approximately 5% wt of a liquid ethoxyquat,
   - approximately 2% wt to approximately 5% wt of an esterquat,
   - approximately 0.1% wt to approximately 0.5% wt of a cellulose based material,
   - approximately 1% wt to approximately 4% wt fermentation based suspending agent,
   - approximately 0.1% wt to approximately 2.5% wt of a non-aqueous polar carrier solvent,
   - approximately 0.05% wt to approximately 0.5% wt of an opacifier,
   - approximately 1% wt to approximately 3% wt of a polymer selected from the group consisting of poly (diallyldimethylammonium chloride) (PQ6) having a molecular weight <100kDa (PQ6 <100kDa); PQ6 having a molecular weight ranging from 200kDa to 300 kDa (PQ6 200-300kDa);
   - PQ6 having a molecular weight ranging from 400 kDa to 500 kDa (PQ6 400-500 kDa);
   - copolymers of vinylpyrrolidone (VP) and quaternized vinylimidazole (QVI) (PQ16) having 5% wt VP and 95% wt QVI (PQ16 5VP-95QVI); PQ16 having 50% wt VP and 50% wt QVI (PQ16 50VP-50QVI); Poly(2-dimethylamino)ethyl methacrylate) methyl chloride quaternary salt (PQ37); 1-propanaminium, N,N,N-trimethyl-3- [(1-oxo-2-propenyl) amino] chloride, homopolymer (A1000); 1-dodecanaminium, N,N-dimethyl-N-[3- [(2-methyl-1-oxo-2-propen-1-yl)amino]propyl]-, chloride (1:1), polymer with sodium 2-methyl-2- [(1-oxo-2-propen-1-yl) amino]-1-propanesulfonate (1:1) and N,N,N-trimethyl-3- [(1-oxo-2-propen-1-yl) amino]-L propanaminium chloride (1:1) (C113); and combinations thereof,
   - encapsulated fragrance,
   - dye,
   - additional fragrance, or any combinations thereof.

2. The composition of claim 1, wherein the benzyl-substituted quaternary ammonium compound is C12-18 alkyl dimethyl benzyl ammonium chloride.

3. The composition of claim 1, wherein the alkylamine oxide is lauramine oxide or decylamine oxide.

4. The composition of claim 1, wherein the citric acid is present in the composition.

5. The composition of claim 1, wherein the liquid ethoxyquat is present in the composition.

6. The composition of claim 1, wherein the cellulose based material is present in the composition.

7. The composition of claim 6, wherein the cellulose based material is hydroxyethylcellulose.

8. The composition of claim 1, wherein the non-aqueous polar carrier solvent material is present in the composition.

9. The composition of claim 8, wherein the non-aqueous polar carrier solvent is propylene glycol.

10. The composition of claim 1, wherein the composition is a clear single-phase liquid.

11. The composition of claim 1, wherein the composition has a pH ranging from approximately 2 to approximately 4.

12. The composition of claim 1, wherein the encapsulated fragrance is present in the composition.

13. The composition of claim 12, wherein the encapsulated fragrance has a polyacrylate or biodegradable shell.

14. The composition of claim 9, wherein the composition is a clear single-phase liquid having a pH ranging from approximately 2 to approximately 4.

15. The composition of claim 1, wherein the polymer is present in the composition.

16. A method of sanitizing laundry during a laundry washing process, the method comprising adding from approximately 30 mL to approximately 180 ml of the composition of claim 1 to a fabric softener compartment of an automatic washing machine and operating the automatic washing machine to perform a laundry washing process.

17. The method of claim 16, wherein the method further softens the laundry.

* * * * *